United States Patent
Rangrej et al.

(10) Patent No.: US 11,788,726 B2
(45) Date of Patent: Oct. 17, 2023

(54) VARYING DILUTION HOLE DESIGN FOR COMBUSTOR LINERS

(71) Applicant: General Electric Company, Schenectady, NY (US)

(72) Inventors: Rimple Rangrej, Bengaluru (IN); Saket Singh, Bengaluru (IN); Pradeep Naik, Bengaluru (IN); Ajoy Patra, Bengaluru (IN)

(73) Assignee: GENERAL ELECTRIC COMPANY, Schenectady, NY (US)

( * ) Notice: Subject to any disclaimer, the term of this patent is extended or adjusted under 35 U.S.C. 154(b) by 0 days.

(21) Appl. No.: 17/653,399

(22) Filed: Mar. 3, 2022

(65) Prior Publication Data

US 2023/0175695 A1 Jun. 8, 2023

(30) Foreign Application Priority Data

Dec. 6, 2021 (IN) .............................. 202111056418

(51) Int. Cl.
*F23R 3/06* (2006.01)
(52) U.S. Cl.
CPC ...................................... *F23R 3/06* (2013.01)
(58) Field of Classification Search
CPC .... F23R 3/06; F23R 3/002; F23R 3/16; F23R 3/50; F23R 3/60; F23R 2900/03041; F23R 2900/03042; F23R 2900/03043; F23R 2900/03044; F23R 2900/03045
See application file for complete search history.

(56) References Cited

U.S. PATENT DOCUMENTS

| | | | |
|---|---|---|---|
| 6,155,056 A | 12/2000 | Sampath et al. | |
| 7,942,005 B2 * | 5/2011 | Bessagnet | F23R 3/06 60/754 |
| 8,281,600 B2 | 10/2012 | Chen et al. | |
| 8,387,397 B2 * | 3/2013 | Chen | F23R 3/06 60/752 |
| 9,518,738 B2 | 12/2016 | Gerendas | |
| 9,976,487 B2 | 5/2018 | Hughes et al. | |
| 10,215,410 B2 | 2/2019 | Moura et al. | |
| 10,801,453 B2 * | 10/2020 | Zankl | F02M 59/367 |

(Continued)

FOREIGN PATENT DOCUMENTS

| | | |
|---|---|---|
| EP | 1500880 B1 | 9/2016 |
| EP | 2423599 B1 | 5/2017 |
| GB | 2512642 A | 10/2014 |

OTHER PUBLICATIONS https://web.archive.org/web/20170210045339/https://en.wikipedia.org/wiki/Turbofan, Feb. 10, 2017.*

(Continued)

*Primary Examiner* — Todd E Manahan
*Assistant Examiner* — Rodolphe Andre Chabreyrie
(74) *Attorney, Agent, or Firm* — Venable LLP; Aziz H. Poonawalla; Michele V. Frank

(57) ABSTRACT

A combustor for a turbomachine engine includes a combustion chamber, a liner forming a boundary of the combustion chamber, and multiple dilution holes through the liner to permit airflow into the combustion chamber. The dilution holes include converging dilution holes and diverging dilution holes, the converging dilution holes having a converging cross-sectional profile and the diverging dilution holes having a diverging cross-sectional profile.

19 Claims, 11 Drawing Sheets

(56) References Cited

U.S. PATENT DOCUMENTS

| | | | |
|---|---|---|---|
| 10,830,143 B2 | 11/2020 | Choi | |
| 11,543,128 B2* | 1/2023 | Grooms | F02C 7/18 |
| 2015/0027127 A1* | 1/2015 | Clemen | F23R 3/002 |
| | | | 60/752 |
| 2019/0186738 A1 | 6/2019 | Moura et al. | |
| 2019/0368736 A1* | 12/2019 | Rudrapatna | F23R 3/045 |

OTHER PUBLICATIONS

A Numerical Study of Flame Characteristics during Lean Blow-Out in a Gas Turbine Combustor, Veeraraghava Raju Hasti, AIAA Propulsion and Energy Forum, Jul. 2018.*

* cited by examiner

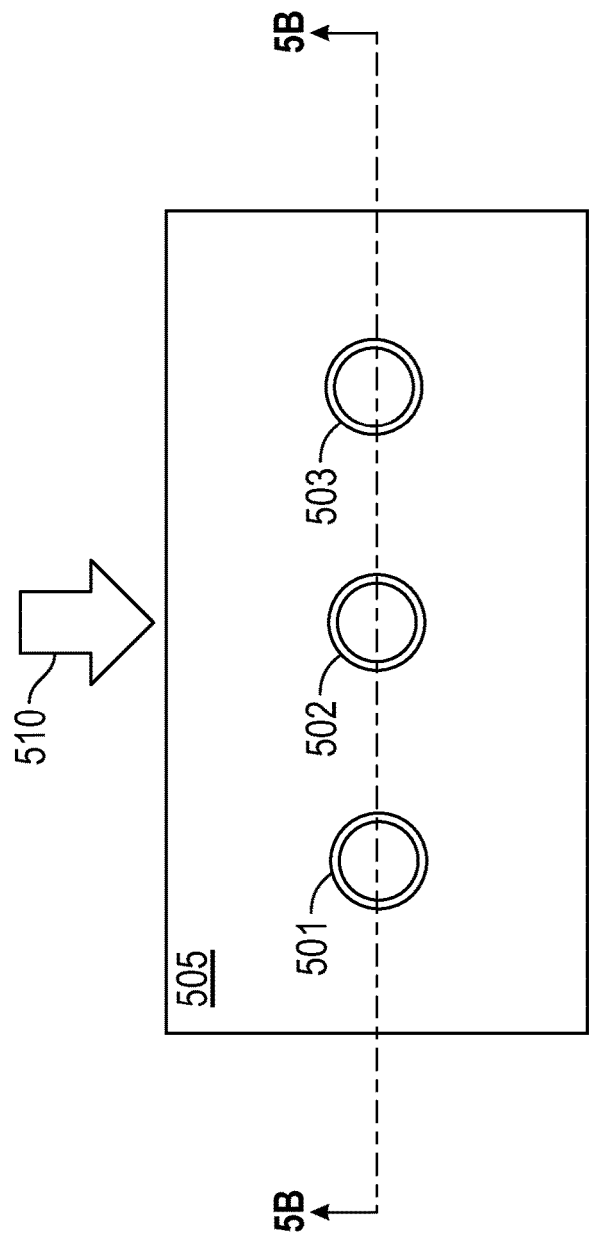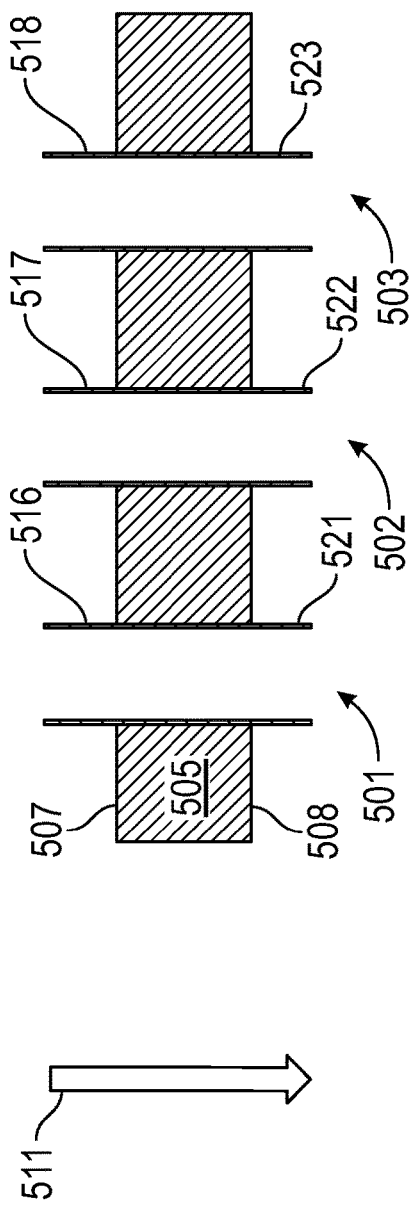

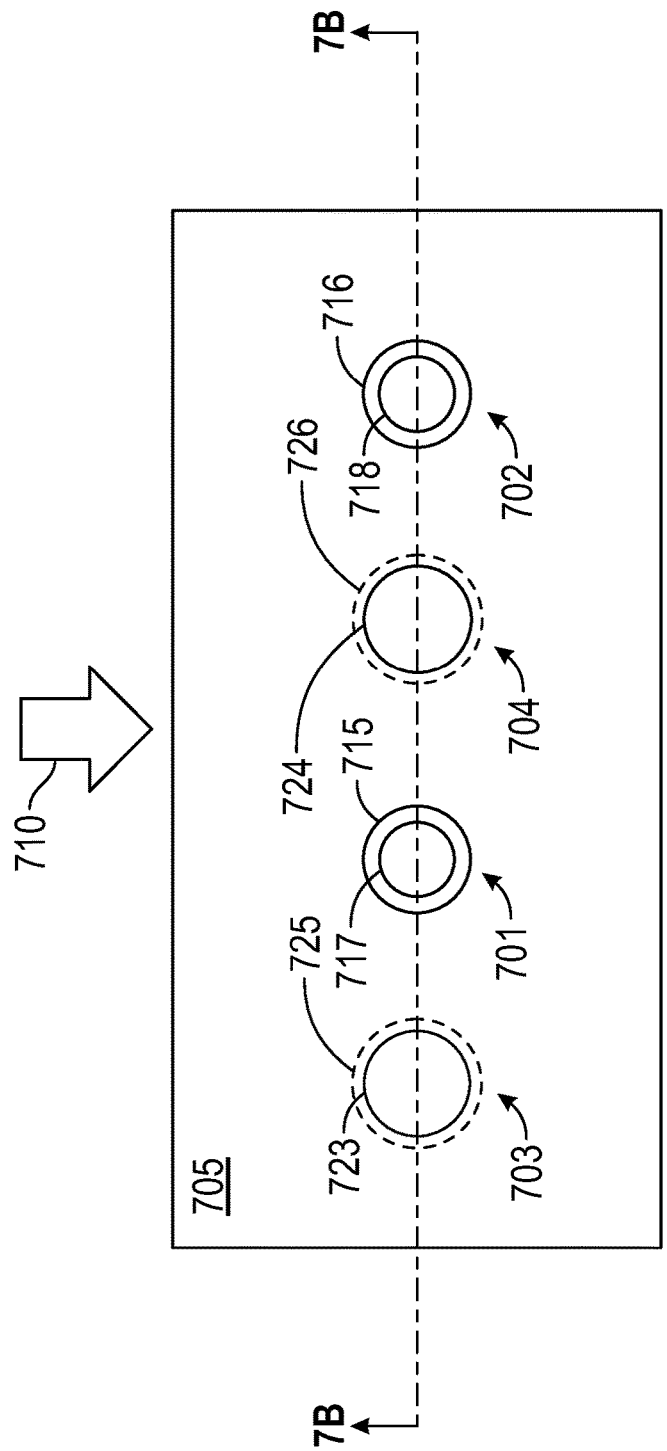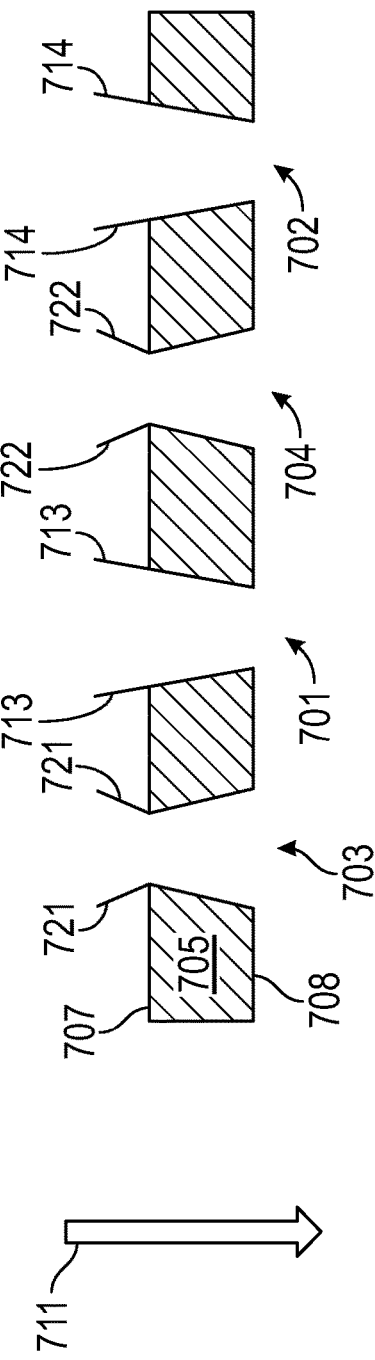

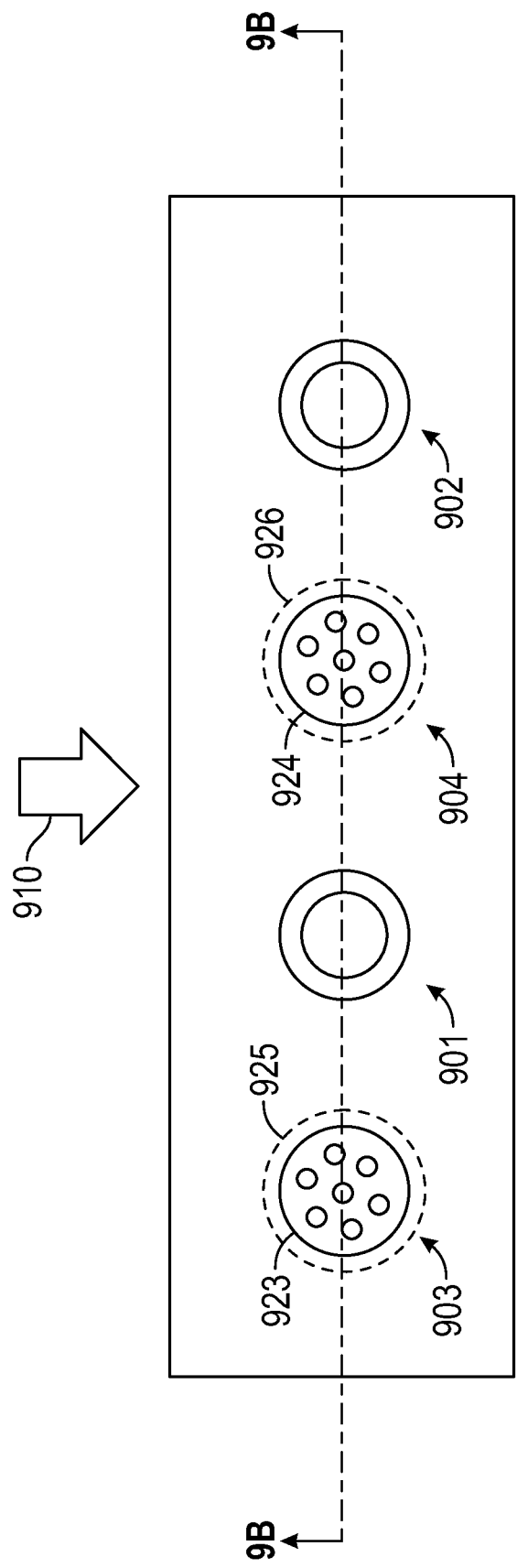
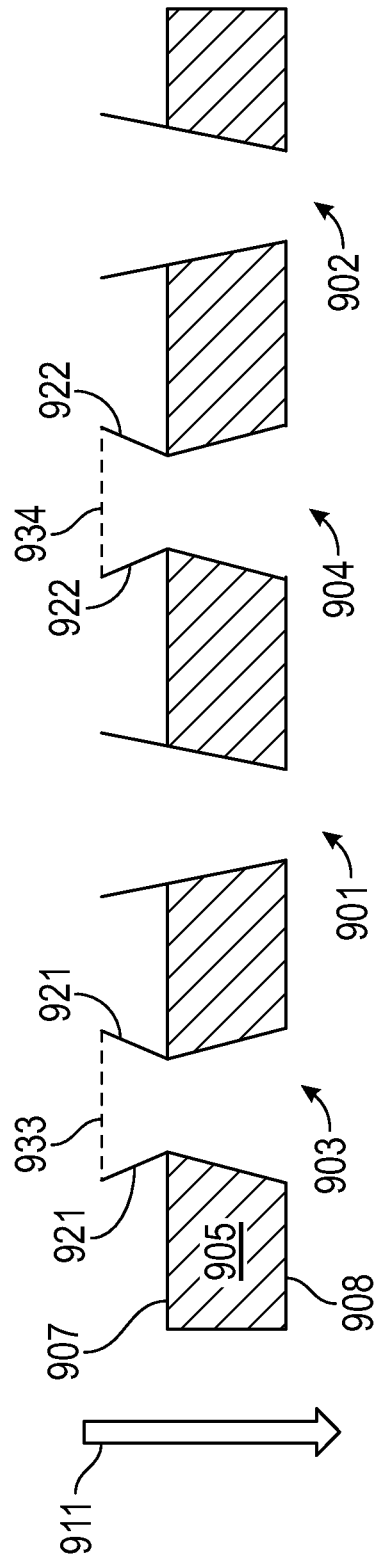

VARYING DILUTION HOLE DESIGN FOR COMBUSTOR LINERS

CROSS REFERENCE TO RELATED APPLICATIONS

The present application claims the benefit of Indian Patent Application No. 202111056418, filed on Dec. 6, 2021, which is hereby incorporated by reference herein in its entirety.

TECHNICAL FIELD

The present disclosure relates to turbomachine engines, including combustors.

BACKGROUND

Combustors in turbomachine engines receive a mixture of fuel and highly compressed air, which is ignited to produce hot combustion gases. These hot gases are used to provide a torque in a turbine to provide mechanical power and thrust. Combustor performance is critical to the overall performance of the gas turbine engine, and is related to fuel efficiency and reduced nitrous oxide (NOx) emissions. Continuing demands for increased engine performance (e.g., higher cycle overall pressure ratio) and fuel efficiency (e.g., lower specific fuel consumption) pose a contradicting challenge to meet environmental requirements for NOx emissions and economic requirements for longer combustor component life cycles.

BRIEF DESCRIPTION OF THE DRAWINGS

Features and advantages of the present disclosure will be apparent from the following description of various exemplary embodiments, as illustrated in the accompanying drawings, wherein like reference numbers generally indicate identical, functionally similar, and/or structurally similar elements.

FIG. 5A provides a view towards the centerline axis from the cold side of a liner of the combustion chamber to the hot side of the liner.

FIG. 5B shows a cross section of the dilution holes in FIG. 5A taken along line 5B-5B, in a view looking forward from a position aft of the combustion chamber.

FIG. 7A illustrates an embodiment of varying dilution holes, providing a view towards the centerline axis from the cold side of a liner of the combustion chamber to the hot side of the liner.

FIG. 7B shows a cross section of the varying dilution holes in FIG. 7A taken along line 7B-7B, providing a view looking forward from a position aft of the combustion chamber.

FIG. 9A illustrates still another embodiment of varying dilution holes, providing a view towards the centerline axis from the cold side of a liner of the combustion chamber to the hot side of the liner.

FIG. 9B shows a cross section of the varying dilution holes in FIG. 9A taken along line 9B-9B, providing a view looking forward from a position aft of the combustion chamber.

DETAILED DESCRIPTION

Figure 1:
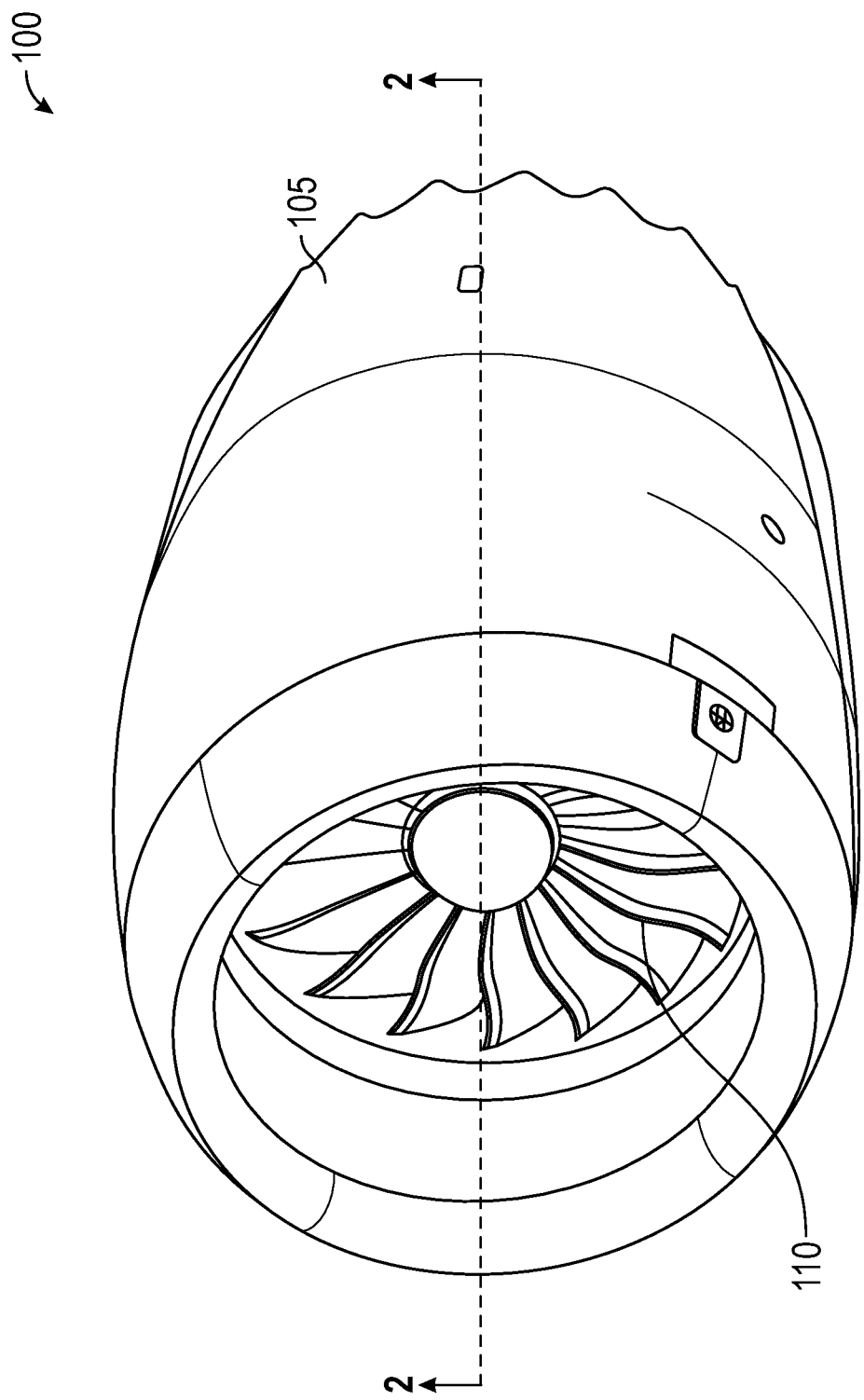
FIG. 1 shows an example of a turbomachine engine, according to an embodiment of the present disclosure.

Features, advantages, and embodiments of the present disclosure are set forth or apparent from a consideration of the following detailed description, drawings, and claims. Moreover, it is to be understood that the following detailed description is exemplary and intended to provide further explanation without limiting the scope of the disclosure as claimed.

Various embodiments are discussed in detail below. While specific embodiments are discussed, this is done for illustration purposes only. A person skilled in the relevant art will recognize that other components and configurations may be used without departing from the spirit and scope of the present disclosure.

As used herein, the terms "first", "second", and "third" may be used interchangeably to distinguish one component from another and are not intended to signify location or importance of the individual components.

The terms "fore" (or "forward") and "aft" refer to relative positions within a turbomachine engine or vehicle, and refer to the normal operational attitude of the turbomachine engine or vehicle. For example, with regard to a gas turbine engine, fore (or forward) refers to a position closer to an engine inlet and aft refers to a position closer to an engine nozzle or exhaust.

The terms "outer" and "inner" refer to relative positions within a turbomachine engine, from a centerline axis of the engine. For example, outer refers to a position further from the centerline axis and inner refers to a position closer to the centerline axis.

The terms "coupled", "fixed", "attached to", and the like, refer to both direct coupling, fixing, or attaching, as well as indirect coupling, fixing, or attaching through one or more intermediate components or features, unless otherwise specified herein.

One or more components of the turbomachine engine described herein below may be manufactured or formed using any suitable process, such as an additive manufacturing process, such as a three-dimensional (3D) printing process. The use of such a process may allow such a component to be formed integrally, as a single monolithic component, or as any suitable number of sub-components. In particular, the additive manufacturing process may allow such a component to be integrally formed and include a variety of features not possible when using prior manufacturing methods. For example, the additive manufacturing methods described herein enable the manufacture of combustors having unique features, configurations, thicknesses, materials, densities, passageways, headers, and mounting structures that may not have been possible or practical using prior manufacturing methods. Some of these features are described herein.

This disclosure and various embodiments relate to a turbomachine engine, also referred to as a gas turbine engine, a turboprop engine, or a turbomachine. These turbomachine engines can be applied across various technologies and industries. Various embodiments may be described herein in the context of aeronautical engines and aircraft machinery.

In some instances, a turbomachine engine is configured as a direct drive engine. In other instances, a turbomachine engine can be configured as a geared engine with a gearbox. In some instances, a propulsor of a turbomachine engine can be a fan encased within a fan case and/or a nacelle. This type of turbomachine engine can be referred to as "a ducted engine." In other instances, a propulsor of a turbomachine engine can be exposed (e.g., not within a fan case or a nacelle). This type of turbomachine engine can be referred to as "an open rotor engine" or an "unducted engine."

FIG. 1 shows an example of a turbomachine engine 100, according to an embodiment of the present disclosure. Types of such engines include turboprops, turbofans, turbomachines, and turbojets. The turbomachine engine 100 is a ducted engine covered by a protective cowl 105, so that the only component visible in this exterior view is a fan assembly 110. A nozzle, not visible in FIG. 1, also protrudes from the aft end of the turbomachine engine 100 beyond the protective cowl 105.

Figure 2:
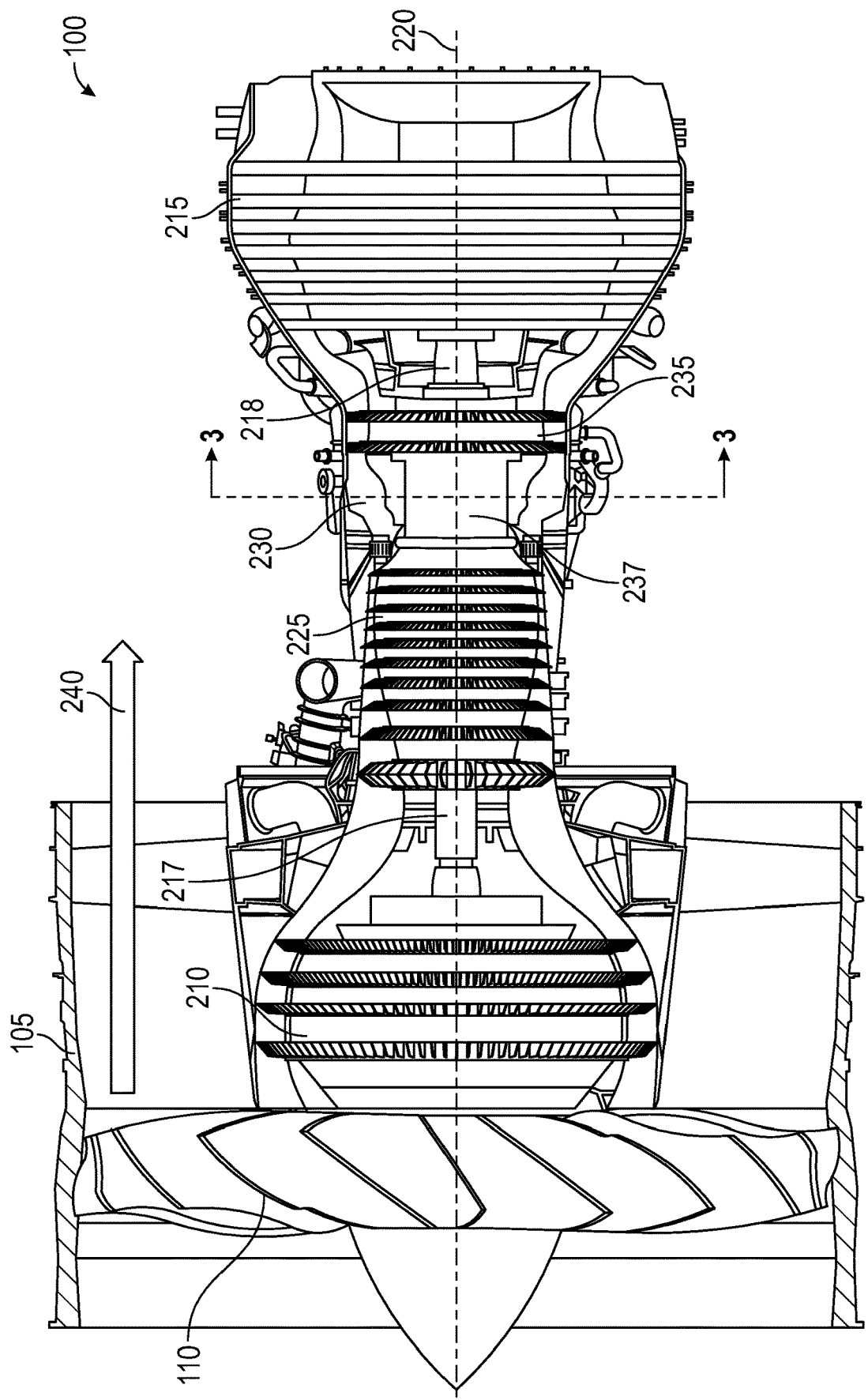
FIG. 2 shows a schematic, cross-sectional view taken along line 2-2 of the turbomachine engine shown in FIG. 1.

FIG. 2 shows a schematic, cross-sectional view taken along line 2-2 of the turbomachine engine 100 shown in FIG. 1, which may incorporate one or more embodiments of the present disclosure. In this example, the turbomachine engine 100 is a two-spool turbomachine that includes a high-speed system and a low-speed system, both of which are fully covered by the protective cowl 105. The low-speed system of the turbomachine engine 100 includes the fan assembly 110, a low-pressure compressor 210 (also referred to as a booster), and a low-pressure turbine 215, all of which are coupled to a low-pressure shaft 217, 218 that extends between the low-speed system components along a centerline axis 220 of the turbomachine engine 100. The low-pressure shaft 217, 218 enables the fan assembly 110, the low-pressure compressor 210, and the low-pressure turbine 215 to rotate in unison about the centerline axis 220.

The high-speed system of the turbomachine engine 100 includes a high-pressure compressor 225, a combustor 230, and a high-pressure turbine 235, all of which are coupled to a high-pressure shaft 237 that extends between the high-speed system components along the centerline axis 220 of the turbomachine engine 100. The high-pressure shaft 237 enables the high-pressure compressor 225 and the high-pressure turbine 235 to rotate in unison about the centerline axis 220, at a different rotational speed than the rotation of the low-pressure components (and, in some embodiments, at a higher rotational speed, and/or a counter-rotating direction, relative to the low-pressure system).

The components of the low-pressure system and the high pressure system are positioned so that a portion of the air taken in by the turbomachine engine 100 flows through the turbomachine engine 100 from fore to aft through the fan assembly 110, the low-pressure compressor 210, the high-pressure compressor 225, the combustor 230, the high-pressure turbine 235, and the low-pressure turbine 215. Another portion of the air intake by the turbomachine engine 100 bypasses the low-pressure system and the high-pressure system, and flows from fore to aft as shown by arrow 240.

The combustor 230 is located between the high-pressure compressor 225 and the high-pressure turbine 235. The combustor 230 can include one or more configurations for receiving a mixture of fuel from a fuel system (not shown in FIG. 2) and air from the high-pressure compressor 225. This mixture is ignited by an ignition system (not shown in FIG. 2), creating hot combustion gases that flow from fore to aft through the high-pressure turbine 235, which provides a torque to rotate the high-pressure shaft 237 and, thereby, rotate the high-pressure compressor 225. After exiting the high-pressure turbine, the combustion gases continue to flow from fore to aft through the low-pressure turbine 215, which provides a torque to rotate the low-pressure shaft 217, 218 and, thereby, rotate the low-pressure compressor 210 and the fan assembly 110.

In other words, the forward stages of the turbomachine engine 100, namely, the fan assembly 110, the low-pressure compressor 210, and the high-pressure compressor 225, all prepare the intake air for ignition. The forward stages all require power in order to rotate. The rear stages of the turbomachine engine 100, namely, the combustor 230, the high-pressure turbine 235, and the low-pressure turbine 215, provide that requisite power, by igniting the compressed air and using the resulting hot combustion gases to rotate the low-pressure shaft 217, 218 and the high-pressure shaft 237 (also referred to as rotors). In this manner, the rear stages use air to physically drive the front stages, and the front stages are driven to provide air to the rear stages.

As the exhaust gas exits out of the aft end of the rear stages, the exhaust gas reaches the nozzle at the aft end of the turbomachine engine 100 (not shown in FIG. 2). When the exhaust passes over the nozzle, and combines with the bypassed air that is also being driven by the fan assembly 110, an exhaust force is created that is the thrust generated by the turbomachine engine 100.

Figure 3:
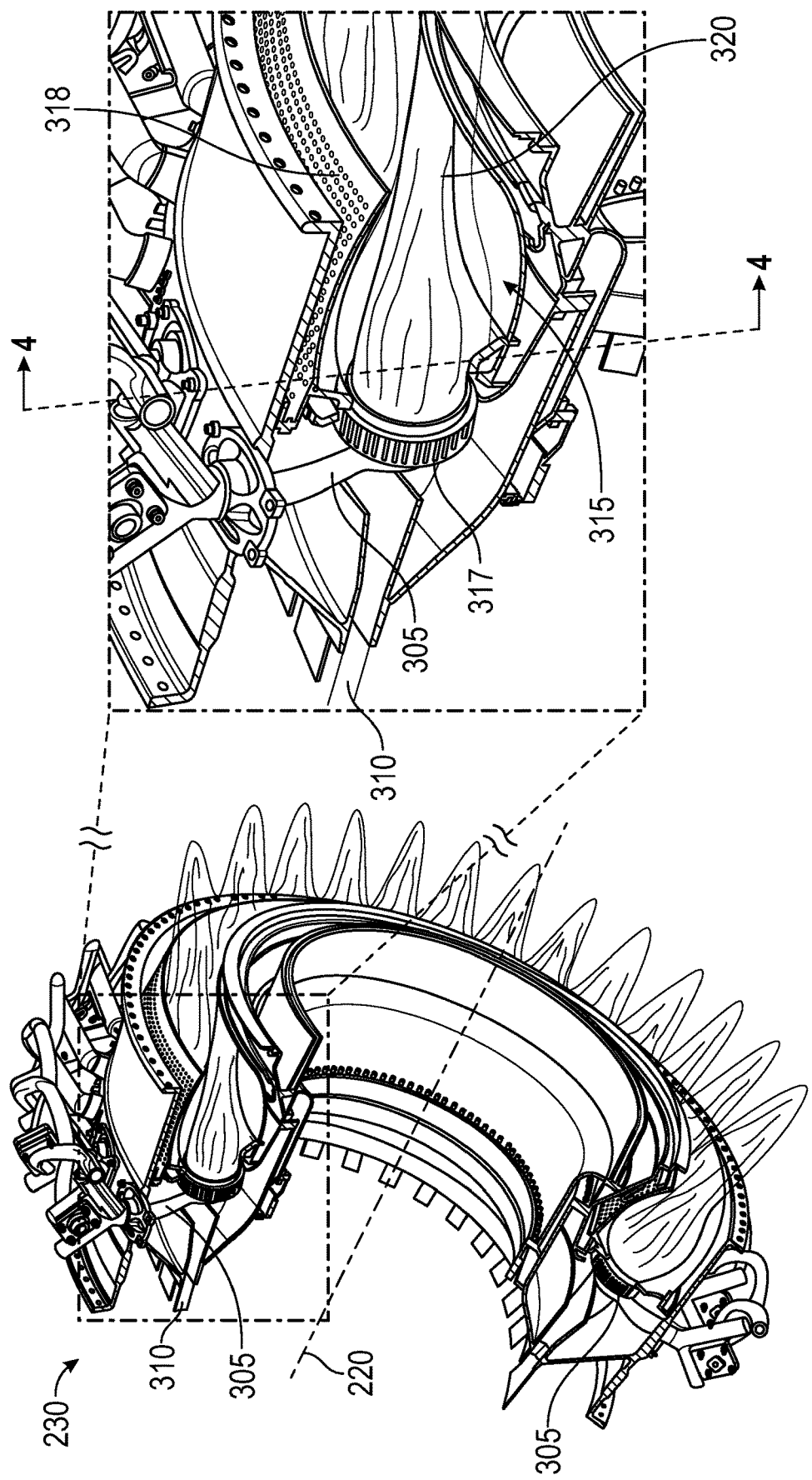
FIG. 3 shows a perspective cross-sectional view taken along line 3-3 of the combustor of the turbomachine engine shown in FIG. 2.

FIG. 3 shows a perspective cross-sectional view taken along line 3-3 of the combustor 230 of the turbomachine engine 100 shown in FIG. 2. The combustor 230 has axial symmetry about the centerline axis 220, that defines an axial direction. The combustor 230 also has an annular ring of fuel nozzles 305 spaced along the circumference (also referred to as the circumferential direction) and facing in the aft direction.

Compressed air 310 from the front stages of the turbomachine engine 100 flows into the combustor and mixes in a combustion chamber 315 with fuel from the fuel nozzles 305. Each fuel nozzle 305 delivers fuel into a separate region (referred to as a cup) of the total annular volume of the combustion chamber 315. The air enters the combustion chamber 315 from swirlers 317 that surround each fuel nozzle 305, as well as through dilution holes 318 in the inner and outer surfaces (also referred to as liners) of the combustion chamber 315. The fuel-air mixture is ignited in the combustion chamber 315 to produce a steady flow of combustion gases 320 that enter the turbines in the rear stages.

Figure 4:
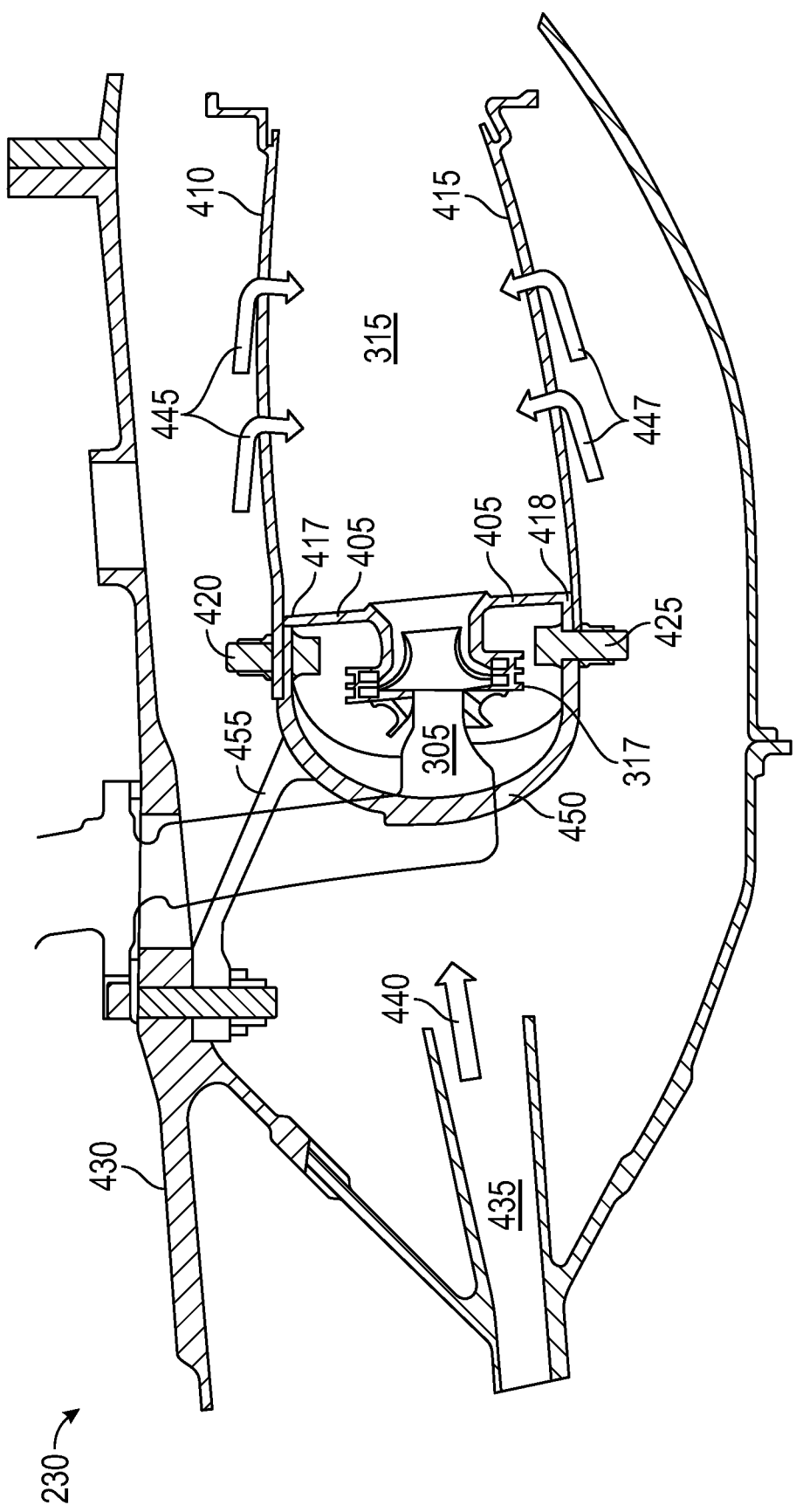
FIG. 4 shows a schematic, cross-sectional view of the combustion chamber taken along line 4-4 of the combustor shown in FIG. 3.

FIG. 4 shows a schematic, cross-sectional view of the combustion chamber 315 taken along line 4-4 of the combustor 230 shown in FIG. 3. This view shows a cross-sectional view through the midplane of a single cup, along the axial length. The combustion chamber 315 is an annular open space around the centerline axis 220 (not shown in FIG. 4), that is bounded at the forward end by a dome 405, which supports and positions the fuel nozzle 305, as well as an outer liner 410 and an inner liner 415 on the outer and inner annular surfaces, respectively. The outer liner 410 and the inner liner 415 are coaxial cylinders around the centerline axis 220, the outer liner 410 being spaced radially outward from the inner liner 415. The dome 405 is oriented perpendicular to the axis of the swirler 317 and is symmetric around the centerline axis 220, with orifices spaced along the circumference to receive each fuel nozzle 305. Because of its proximity to the combustion chamber, hot gases, and the extreme temperatures produced therein, the dome 405 must be configured to withstand a harsh environment. The combustion chamber 315 is open in the aft direction, to allow combustion gases to flow towards the high-pressure turbine 235 (not shown in FIG. 4).

The outer liner 410 and the inner liner 415 have a cylindrical shape with rotational symmetry around the centerline axis 220 (not shown in FIG. 4), the outer liner 410 having a radius greater than that of the inner liner 415. Both the outer liner 410 and the inner liner 415 extend in the aft direction along the centerline axis 220, with dilution holes along their surface to allow additional air from the high-pressure compressor 225 (not shown in FIG. 4) to mix with the fuel in the combustion chamber 315. Each liner has a cold side, which is the surface outside the combustion chamber 315 through which air enters the dilution holes, and a hot side, which is the surface inside the combustion chamber through which air exits the dilution holes.

In the example of FIG. 4, the dome 405, the outer liner 410, and the inner liner 415 are all made of metal, though in some embodiments at least portions of the outer liner 410 and the inner liner 415 may alternatively be made of ceramic matrix composite materials. The liners may include integrally joined portions that are mechanically joined using an overlapping portion according to one embodiment. In other embodiments, the liners are formed in an additive manufacturing process as one unitary body.

The dome 405 and the outer liner 410 are coupled together at an outer wall 417 of the dome 405, and the dome 405 and the inner liner 415 are coupled together at an inner wall 418 of the dome 405 with arrays 420, 425 of fasteners. The fasteners in the arrays 420, 425 may include one or more of pins, bolts, nuts, nut plates, screws, and any other suitable types of fasteners. The arrays 420, 425 also serve to couple the dome 405, the outer liner 410, and the inner liner 415 to a support structure 430 of the combustor 230.

The support structure 430 defines an inlet 435 for compressed air to flow from the high-pressure compressor 225 (not shown in FIG. 4), from fore to aft as shown by arrow 440, and into the combustion chamber 315 through the swirler 317 positioned around the fuel nozzle 305. The air also flows into the combustion chamber 315 through dilution holes in the outer liner 410 (e.g., along arrows 445) and through dilution holes in the inner liner 415 (e.g., along arrows 447). In addition, one or more heat shields and/or deflectors (not shown in FIG. 4) may also be provided on the dome 405 to help protect the dome 405 from the heat of the combustion gases.

In addition, the support structure 430 supports the dome 405 with a mounting arm 455 that connects to a structural mount 450, which has an annular symmetry about the centerline axis 220, forming an aft-facing channel to receive the dome 405, and having a forward-facing aperture to receive the fuel nozzle 305. The structural mount 450 is coupled directly to the outer wall 417 and the inner wall 418 of the dome 405 by the arrays 420, 425 of fasteners.

FIGS. 5A and 5B illustrate a general example of dilution holes 501, 502, 503 in a liner 505 of the combustion chamber 315 of FIG. 4. FIG. 5A provides a view towards the centerline axis 220 (not shown in FIG. 5A) from a cold side 507 (see FIG. 5B) of the liner 505 (outside the combustion chamber 315), to a hot side 508 (see FIG. 5B) of the liner 505 (inside the combustion chamber 315). FIG. 5B shows a cross section of the dilution holes 501, 502, 503 in FIG. 5A taken along line 5B-5B, in a view from the aft, looking forward (ALF) of the combustion chamber 315 of FIG. 4. The liner 505 may be the outer liner 410 or the inner liner 415 of FIG. 4. The dilution holes 501, 502, 503 are shown arranged along the circumferential direction of the combustor 230 of FIG. 4, and additional dilution holes (not shown) may also be arranged along the axial direction of the combustor 230.

Air from the high-pressure compressor 225 of FIG. 2, flows in the axial direction (represented by arrow 510) along the cold side of the liner 505, enters the dilution holes 501, 502, 503 on the cold side 507 of the liner 505 in the transverse direction (represented by arrow 511), and exits on the hot side 508 of the liner 505 into the combustion chamber 315.

In some embodiments, the dilution holes 501, 502, 503 are apertures that are machined or drilled through the surface of the liner 505. In other embodiments, the dilution holes 501, 502, 503 are inserts made of metal that are manufactured separately from the liner 505, for insertion into previously existing holes, e.g., using additive manufacturing techniques. The inserts may be brazed, tap-fitted, press-fitted, or tack-welded into the previously existing holes.

In some embodiments, the inserts may have cold chutes that extend outwards from the cold side 507, hot chutes that extend outwards from the hot side 508 (i.e., into the combustion chamber 315), or both. For example, the dilution holes 501, 502, 503 are inserts with cold chutes 516, 517, 518 and hot chutes 521, 522, 523. In this example, the dilution holes 501, 502, 503 have a circular aperture of equal diameter on both the cold side 507 and the hot side 508 of the liner 505. The dilution holes 501, 502, 503, therefore, have a rectangular profile. Alternatively, in some embodiments, one or more of the chutes on both sides of the liner 505 may be formed as integral to the liner 505 instead of being inserts, by manufacturing techniques such as additive manufacturing.

Some embodiments improve the mixing of fuel and air in the combustion chamber 315 by using varying dilution hole profiles. For example, the varying dilution hole profiles may include diverging dilution holes and converging dilution holes, as described in further detail below. Converging dilution holes improve the penetration of air into the combustion chamber 315, which improves the mixing of fuel and air. Diverging dilution holes improve the spread of air laterally within the combustion chamber 315, which increases the surface area of the mixing plane. In some embodiments, although the dilution holes are designed so that even though the profile of diverging dilution holes and converging dilution holes are varying, the mass flow rate is the same.

Both converging and diverging types of dilution holes have an intake aperture on the cold side of the liner, and an exit aperture on the hot side of the liner. Converging dilution holes are generally characterized by having an exit aperture with a transverse cross-sectional area that is less than that of the intake aperture. Diverging dilution holes are generally characterized by having an exit aperture with a transverse cross-sectional area that is greater than (or in some cases, equal to) that of the intake aperture.

Figure 6:
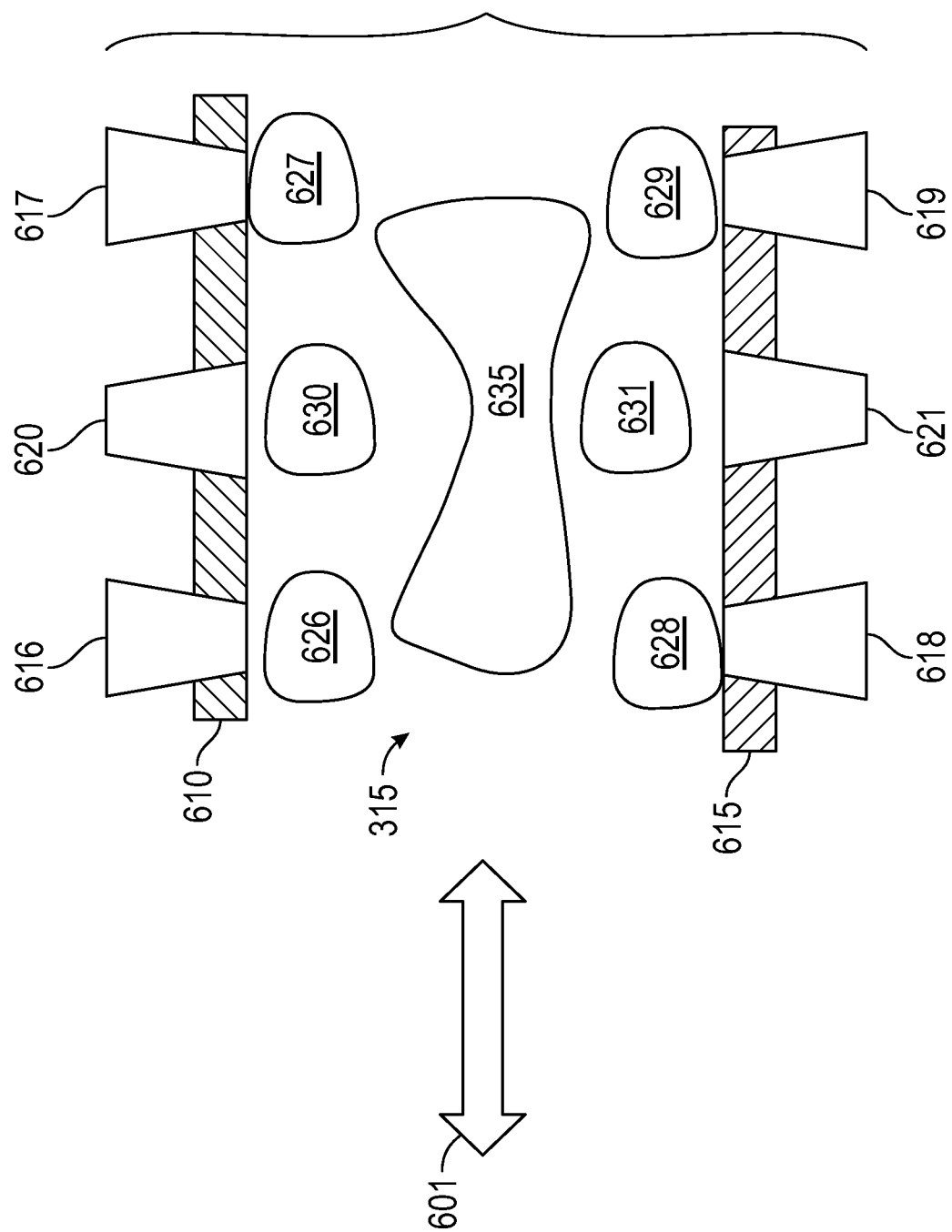
FIG. 6 conceptually illustrates the effects of varying diverging dilution holes and converging dilution holes on the fuel-air mixing zone.

FIG. 6 conceptually illustrates the effects of varying diverging dilution holes and converging dilution holes on the fuel-air mixing zone within the combustion chamber 315 of FIG. 4. This view is looking forward from a position aft of the combustion chamber 315, with the circumferential direction represented by double-sided arrow 601. Portions of both an outer liner 610 and an inner liner 615 are illustrated, with converging dilution holes 616, 617, 618, 619 and diverging dilution holes 620 and 621 visible and arranged in a staggered, alternating pattern in both liners.

Air entering the combustion chamber 315 through the converging dilution holes 616 to 619 creates low-pressure regions 626, 627, 628, 629 adjacent to the corresponding exit apertures on the hot sides of the outer liner 610 and the inner liner 615. This is because the exit aperture is narrower than the intake aperture on the cold side, causing the air to have a higher velocity when exiting the hole. The potential energy from air pressure is converted to kinetic energy, and, therefore, the pressure drops and the velocity increases. Conversely, air entering the combustion chamber 315 through the diverging dilution holes 620, 621 creates relatively high-pressure regions 630, 631 adjacent to the corresponding exit apertures on the hot sides of the outer liner 610 and the inner liner 615.

The differential pressure created in the circumferential direction by the alternating arrangement of converging and diverging dilution holes causes a central recirculation zone 635 of hot recirculation gases (also referred to as a bubble) within the combustion chamber 315 to stretch towards the low-pressure regions 626 to 629 and to deflect away from the high-pressure regions 630, 631. These stretching and deflection effects increase shear within the flow of air and increases the strain in the combustion flame, which increases turbulence kinetic energy within the recirculation zone 635 and, thereby, improves the mixing of fuel and air.

Furthermore, the staggered arrangement of higher penetration and higher spread helps in preventing hot gases from accumulating in the dilution wake zone, which improves fuel efficiency and shortens the zone of fuel-air mixing within the combustor 230. Some advantages of these improvements include reduced NOx emission and shorter combustor length.

In FIG. 6, one possible pattern of placement of the dilution holes is shown, in which diverging dilution holes 620, 621 are alternated with converging dilution holes 616, 617, 618, 619 in the outer and inner liners 610, 615 of the combustor. In different embodiments, however, numerous other patterns are possible, including a randomized variation between converging and diverging dilution holes, and repeating sets of dilution holes of each type. For example, one possible pattern is two converging dilution holes followed by two diverging dilution holes. Other possible patterns include three converging dilution holes followed by one diverging dilution hole, or three diverging dilution holes followed by one converging dilution hole. The pattern may repeat circumferentially, and may repeat within each cup sector, and may have a different pattern at the boundary between cup sectors. Alternatively, the pattern may repeat independently of cup sectors.

In some embodiments, the pattern also includes constant area dilution holes (i.e., dilution holes that do not converge or diverge, but instead have a constant area). For example, one possible pattern may have a converging dilution hole, followed by a constant dilution hole, followed by a diverging dilution hole, which then repeats. The pattern is not limited, however, to one type of each dilution hole. Any number of constant, converging, and diverging dilution holes may be used in any repeating pattern, with the number of each type of dilution hole being different or the same. Moreover, the pattern may be circumferentially arranged on the liner around the centerline axis 220, axially arranged on the liner along the centerline axis 220, and/or some combination of both, e.g. arranged at an angle relative to the centerline axis, the angle being between zero and ninety degrees. More than one pattern of dilution holes may be used at the same time on the liner. For example, a liner may have one repeating circumferential pattern, another circumferential repeating pattern parallel to the first pattern, and an axial pattern perpendicular to the circumferential pattern(s). The other liner may have the same type and/or number of patterns of dilution holes, or may have a different number and/or type of patterns of dilution holes.

In some embodiments, the repeating pattern may include any number (e.g., between one to three inclusive) of converging dilution holes, any number (e.g., between one to three inclusive) of diverging dilution holes, and any number (e.g., between one to three inclusive) of constant area dilution holes, or may omit one of the three types of dilution holes (converging, dilution, and/or constant area).

The pattern of placement of the dilution holes can also depend upon the combustor 230 design. For example, having more converging dilution holes for higher jet penetration near the center of each cup, and having more diverging holes near the boundaries between cups for higher spread, can be beneficial in some embodiments, since, in those regions, the bulk velocity of air flow is lower, and higher penetration can be achieved with a lower velocity.

Additionally, in FIG. 6, the pattern of dilution hole types on the outer liner 610 is aligned with the pattern of dilution hole types on the inner liner 615 (i.e., a converging dilution hole 616, 617 on the outer liner 610 facing a converging dilution hole 618, 619 on the inner liner 615, and a diverging dilution hole 620 on the outer liner 610 facing a diverging dilution hole 621 on the inner liner 615). In other embodiments, however, a combination of a staggered arrangement between the outer liner 610 and the inner liner 615 (i.e., a converging dilution hole on the outer liner facing a diverging dilution hole on the inner liner, and vice-versa), can further increase the turbulence kinetic energy within the recirculation zone 635. In some embodiments, the pattern of dilution holes can also be varied in the axial direction, to provide additional pressure differentials across the recirculation zone 635 along the length of the combustor, for better air-fuel mixing, reduction of hot spots and cold spots within the combustion chamber 315, and further reduction in NOx emissions.

The converging dilution holes 616 to 619 are conceptually represented in FIG. 6 by a trapezoidal profile that is wider on the cold side of the liners 610, 615 and narrower on the hot side of the liners 610, 615. Likewise, the diverging dilution holes 620, 621 are conceptually represented in FIG.

6 by a trapezoidal profile that is wider on the hot side of the liners 610, 615 and narrower on the cold side of the liners 610, 615. In practice, however, the profiles of both the converging dilution holes and the diverging dilution holes may vary in different embodiments, some examples of which are described in further detail below.

FIGS. 7A and 7B illustrate an embodiment of varying dilution holes 701, 702, 703, 704, in a liner 705 of the combustion chamber 315 of FIG. 4. FIG. 7A provides a view towards the centerline axis 220 from a cold side 707 (see FIG. 7B) of the liner 705 (outside the combustion chamber 315), to a hot side 708 (see FIG. 7B) of the liner 705 (inside the combustion chamber 315). FIG. 7B shows a cross section of the dilution holes 701, 702, 703, 704 in FIG. 7A taken along line 7B-7B, in a view from the aft, looking forward, of the combustion chamber 315. The liner 705 may be an outer liner or an inner liner. The dilution holes 701 to 704 are shown arranged along the circumferential direction of the combustor 230 of FIG. 4, and additional dilution holes (not shown) may also be arranged along the axial direction of the combustor 230.

Air from the high-pressure compressor flows in the axial direction (represented by arrow 710) along the cold side 707 of the liner 705, enters the dilution holes 701 to 704 in the transverse direction (represented by arrow 711), and exits the dilution holes 701 to 704 on the hot side 708 of the liner 705 into the combustion chamber 315.

The dilution holes 701 to 704 include converging dilution holes 701, 702 and diverging dilution holes 703, 704. The converging dilution holes 701, 702 are inserts in this embodiment, with cold chutes 713, 714 that extend above the surface of the cold side 707 of the liner 705. In this case, the converging dilution holes 701, 702 do not have any hot side chutes. The converging dilution holes 701, 702 have circular intake apertures 715, 716 on the cold side 707 of the liner 705 and circular exit apertures 717, 718 on the hot side 708 of the liner 705. The diameter of the intake apertures 715, 716 is greater than the diameter of the exit apertures 717, 718. Accordingly, the diameter of the converging dilution holes 701, 702 linearly decreases, giving the converging dilution holes 701, 702 a trapezoidal profile that is narrower on the hot side 708 of the liner 705 and wider on the cold side 707 of the liner 705.

Note that exit apertures 717, 718 and corresponding intake apertures 715, 716, are depicted with solid circles in FIG. 7A, to indicate that both apertures are directly visible in this view.

The diverging dilution holes 703, 704 are also inserts in this embodiment, with cold chutes 721, 722 that extend above the surface of the cold side 707 of the liner 705. In this case, the diverging dilution holes 703, 704 do not have any hot side chutes. The diverging dilution holes 703, 704 have circular intake apertures 723, 724 on the cold side 707 of the liner 705 and circular exit apertures 725, 726 on the hot side 708 of the liner 705. The diameter of the diverging dilution holes 703, 704 decreases linearly from the intake apertures 723, 724 to the surface of the cold side 707, and then increases linearly from the cold side 707 to the surface of the hot side 708. Accordingly, the diverging dilution holes 703, 704 have a dual-trapezoidal profile, that is wider at the apertures 723-726 but narrows in the middle. The wider intake apertures 723, 724 permit more air to enter the diverging dilution holes 703, 704, which further increases the spread of air from the exit apertures 725, 726.

Note that exit apertures 725, 726 are depicted with dashed circles in FIG. 7A, to indicate that, in this example, their diameter is greater than that of the corresponding intake apertures 723, 724, and, therefore, the exit apertures 725, 726 are not directly visible in this view. In some embodiments, however, the diameter of the exit apertures 725, 726 may be less than the diameter of the corresponding intake apertures 723, 724, depending on the geometry of the cold chutes 721, 722, since the intake apertures 723, 724 are located at the end of the cold chutes 721, 722.

All dilution holes 701, 702, 703, 704 are inserts in this example, with cold chutes 713, 714, 721, 722. A similar arrangement of varying converging and diverging dilution holes is possible, however, with dilution holes that are not inserts. Moreover, the dilution holes may have hot side chutes in addition to or instead of the cold side chutes, or no chutes at all.

In various embodiments, the shape of the inlet of converging dilution holes and diverging dilution holes can be rounded, chamfered, and/or bell-shaped to improve the inlet streamlines and better align the flow. Converging dilution holes may variously have a straight hole, a converging passage, or a contoured converging rectangular oval racetrack design. Diverging dilution holes may have a contoured section and/or a non-contoured section, converging and/or diverging sections, and multiple holes at the inlet to form a mesh across the surface. The cross-sectional profile of diverging dilution holes may be linearly diverging sections or smoothly varying curves.

In various embodiments, dilution holes of both converging type and diverging type may have a different profile in the circumferential direction than in the axial direction, and may have different shapes for the intake aperture and/or exit aperture than circles, including triangles, ellipses, rectangular ovals (i.e., "racetracks"), and other geometric shapes, rotated at any suitable angle relative to the circumferential direction or the axial direction. Some embodiments also vary the shape and the angle of the exit apertures to further optimize the spread and penetration pattern.

The transverse cross-sectional area of a dilution hole varies continuously from intake aperture to exit aperture as the shape transitions from one geometric shape and/or size at the intake aperture to another geometric shape and/or size at the exit aperture. When both apertures have circular profiles, the cross-sectional profile varies linearly. When the apertures have different geometric shapes, the cross-sectional profile may vary non-linearly or piecewise linearly. A trapezoidal profile, for example, has a piecewise linear profile, and an hourglass profile has a non-linear profile. For converging dilution holes, the ratio of the transverse cross-sectional areas of the intake aperture to the exit aperture is generally greater than one. For diverging dilution holes, the ratio of the transverse cross-sectional areas of the intake aperture to the exit aperture is generally less than one.

The dilution hole designs can be attained in the form of inserts, with cold side chutes having a top hat profile. In preferred embodiments, the height of the cold side chute can range between one hundred millimeters to two hundred fifty millimeters beyond the cold side surface, depending upon the combustor passage velocity. The inserts can also be formed in the form of a hot side chute with an inverted top hat profile. This allows for better spread within the core of the combustor. Since hot side chutes are exposed to higher temperatures, various cooling solutions may be used, such as slots in the chutes. In preferred embodiments, the height on the hot side can range from fifty millimeters to three hundred fifty millimeters beyond the hot side surface. Each design can have both cold side features, hot side chute features, or both, to attain a desired flow field, based on the combustor design.

In some embodiments, a separate panel of dilution holes can be formed having aerodynamic foil shapes, with suction and pressure sides that mimic the same flow behavior and produce a pressure gradient circumferentially at a given radial location.

The position and pattern of diverging and converging dilution holes, geometric shapes of intake and exit apertures, and additional features such as cold chutes and hot chutes, are all variables that can be optimized for individual turbomachine engine designs. For example, these variables can be chosen to selectively reduce hotspots within the combustion chamber 315 of FIG. 4 when the turbomachine engine is operating at critical speeds (e.g., during takeoff and landing of aircraft). By using inserts, existing turbomachine engines can also be retro-fitted to improve their combustion chamber 315 characteristics and overall performance.

FIGS. 8A, 8B, 9A, 9B, 10A, 10B, 11A, and 11B schematically illustrate some additional embodiments of converging dilution holes and diverging dilution holes. These embodiments are similar to the embodiment described above with respect to FIGS. 7A and 7B, and like reference numerals have been used to refer to the same or similar components. A detailed description some of these components will be omitted, and the following discussion focuses on the differences between these embodiments. Any of the various features discussed with any one of the embodiments discussed herein may also apply to and be used with any other embodiments.

Figure 8A:
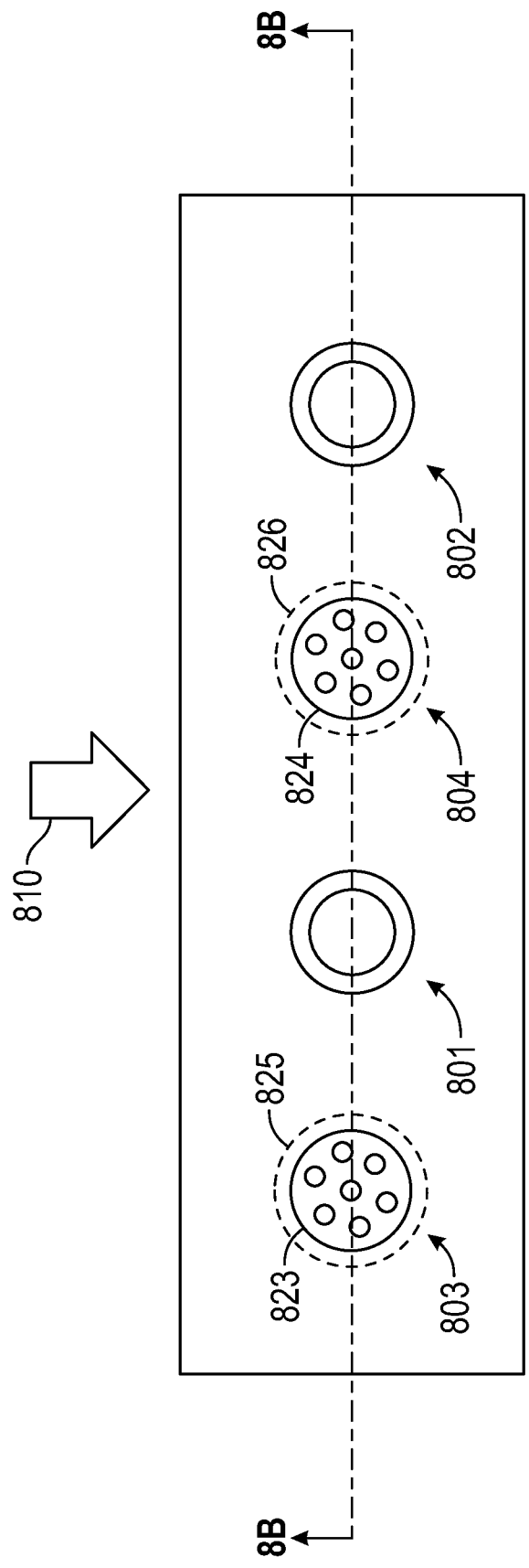
FIG. 8A illustrates another embodiment of varying dilution holes, providing a view towards the centerline axis from the cold side of a liner of the combustion chamber to the hot side of the liner.
Figure 8B:
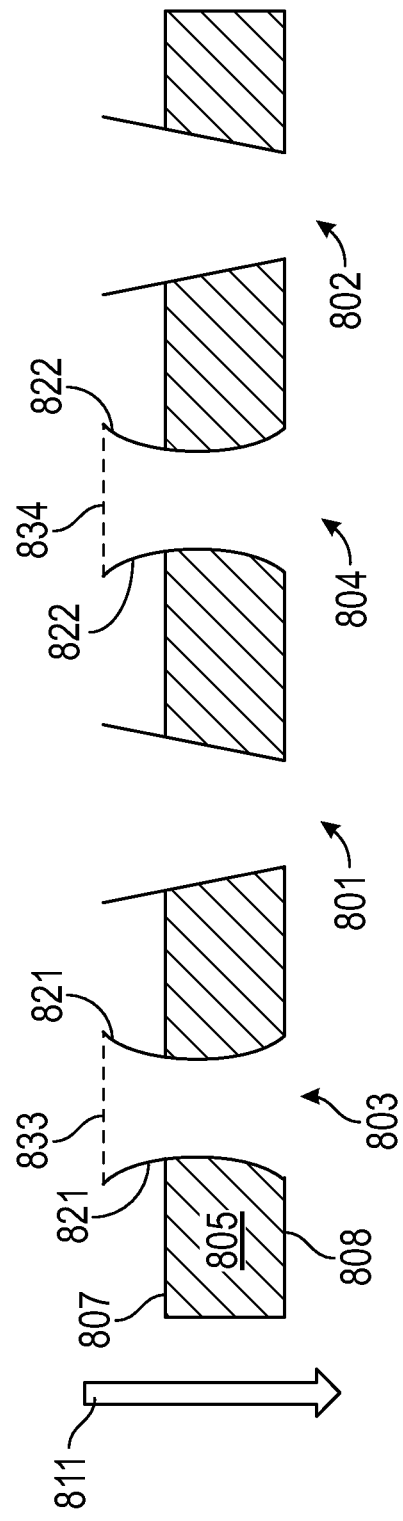
FIG. 8B shows a cross section of the varying dilution holes in FIG. 8A taken along line 8B-8B, providing a view looking forward from a position aft of the combustion chamber.

FIGS. 8A and 8B illustrate another embodiment of varying dilution holes 801, 802, 803, 804, in a liner 805 of the combustion chamber 315 of FIG. 4. FIG. 8A provides a view towards the centerline axis 220 (see FIG. 4) from a cold side 807 (see FIG. 8B) of the liner 805 (outside the combustion chamber 315), to a hot side 808 (see FIG. 8B) of the liner 805 (inside the combustion chamber 315). FIG. 8B shows a cross section of the dilution holes 801, 802, 803, 804 in FIG. 8A taken along line 8B-8B, in a view from the aft, looking forward, of the combustion chamber 315. The liner 805 may be an outer liner or an inner liner. The dilution holes 801 to 804 are shown arranged along the circumferential direction of the combustor 230, and additional dilution holes (not shown) may also be arranged along the axial direction of the combustor 230 (see FIG. 4).

Air from the high-pressure compressor flows in the axial direction (represented by arrow 810) along the cold side 807 of the liner 805, enters the dilution holes 801 to 804 in the transverse direction (represented by arrow 811), and exits the dilution holes 801 to 804 on the hot side 808 of the liner 805 into the combustion chamber 315.

The dilution holes 801 to 804 include converging dilution holes 801, 802 and diverging dilution holes 803, 804. The converging dilution holes 801, 802 in this example are similar to the converging dilution holes 701, 702 described with reference to FIGS. 7A and 7B. The diverging dilution holes 803, 804 are also inserts in this embodiment, with cold chutes 821, 822 that extend above the surface of the cold side 807 of the liner 805. In this case, the diverging dilution holes 803, 804 do not have any hot side chutes. The diverging dilution holes 803, 804 have circular intake apertures 823, 824 on the cold side 807 of the liner 805 and circular exit apertures 825, 826 on the hot side 808 of the liner 805. In addition, the diverging dilution holes 803, 804 each has multi-hole grids 833, 834 that form a mesh surface across the intake apertures 823, 824.

The diameter of the diverging dilution holes 803, 804 decreases smoothly from the intake apertures 823, 824 to the surface of the cold side 807, and, then, increases smoothly from the cold side 807 to the surface of the hot side 808. Accordingly, the diverging dilution holes 803, 804 have an hourglass profile, that is wider at the apertures 823-826 but narrows in the middle. The wider intake apertures 823, 824 permit more air to enter the diverging dilution holes 803, 804, which further increases the spread of air from the exit apertures 825, 826. In addition, the multi-hole grids 833, 834 provide an additional pressure differential at the intake of the diverging dilution holes 803, 804, which results in further decrease of velocity, and accordingly further increase in spread of air upon exit. By adding the multi-hole grids 833, 834, the reduced pressure also reduces the penetration of cold air into the combustion chamber 315, which helps counteract hot spots near the liner 805.

In some embodiments, the multi-hole grids 833, 834 provide a sufficient pressure differential that the diverging dilution holes 803, 804 do not need to have a varying cross-sectional area from the intake aperture to the exit aperture in order to provide a spread of air from the exit apertures 825, 826. In such embodiments, the diameter of the diverging dilution holes 803, 804 may remain constant from the cold side 807 to the hot side 808, and have a rectangular profile similar to that shown in FIG. 5B.

Note that exit apertures 825, 826 are depicted with dashed circles in FIG. 8A, to indicate that, in this example, their diameter is greater than that of the corresponding intake apertures 823, 824, and, therefore, the exit apertures 825, 826 are not directly visible in this view. In some embodiments, however, the diameter of the exit apertures 825, 826 may be less than the diameter of the corresponding intake apertures 823, 824, depending on the geometry of the cold chutes 821, 822, since the intake apertures 823, 824 are located at the end of the cold chutes 821, 822.

FIGS. 9A and 9B illustrate another embodiment of varying dilution holes 901, 902, 903, 904, in a liner 905 of the combustion chamber 315 of FIG. 4. FIG. 9A provides a view towards the centerline axis 220 (see FIG. 4) from a cold side 907 (see FIG. 9B) of the liner 905 (outside the combustion chamber 315), to a hot side 908 (see FIG. 9B) of the liner 905 (inside the combustion chamber 315). FIG. 9B shows a cross section of the dilution holes 901, 902, 903, 904 in FIG. 9A taken along line 9B-9B, in a view from the aft, looking forward, of the combustion chamber 315. The liner 905 may be an outer liner or an inner liner. The dilution holes 901 to 904 are shown arranged along the circumferential direction of the combustor 230 (see FIG. 4), and additional dilution holes (not shown) may also be arranged along the axial direction of the combustor 230.

Air from the high-pressure compressor flows in the axial direction (represented by arrow 910) along the cold side 907 of the liner 905, enters the dilution holes 901 to 904 in the transverse direction (represented by arrow 911), and exits the dilution holes 901 to 904 on the hot side 908 of the liner 905 into the combustion chamber 315.

The dilution holes 901 to 904 include converging dilution holes 901, 902 and diverging dilution holes 903, 904. The converging dilution holes 901, 902 in this example are similar to the converging dilution holes 701, 702 described with reference to FIGS. 7A and 7B. The diverging dilution holes 903, 904 are also inserts in this embodiment, with cold chutes 921, 922 that extend above the surface of the cold side 907 of the liner 905. In this case, the diverging dilution holes 903, 904 do not have any hot side chutes. The diverging dilution holes 903, 904 have circular intake apertures 923, 924 on the cold side 907 of the liner 905 and circular exit apertures 925, 926 on the hot side 908 of the liner 905. In addition, the diverging dilution holes 903, 904 each has multi-hole grids 933, 934 that form a mesh surface across the intake apertures 923, 924.

The diameter of the diverging dilution holes 903, 904 decreases linearly from the intake apertures 923, 924 to the surface of the cold side 907, and, then, increases linearly from the cold side 907 to the surface of the hot side 908. Accordingly, the diverging dilution holes 903, 904 have a dual-trapezoidal profile, that is wider at the apertures but narrows in the middle. The wider intake apertures 923, 924 permit more air to enter the diverging dilution holes 903, 904, which further increases the spread of air from the exit apertures 925, 926.

Note that exit apertures 925, 926 are depicted with dashed circles in FIG. 9A, to indicate that, in this example, their diameter is greater than that of the corresponding intake apertures 923, 924, and, therefore, the exit apertures 925, 926 are not directly visible in this view. In some embodiments, however, the diameter of the exit apertures 925, 926 may be less than the diameter of the corresponding intake apertures 923, 924, depending on the geometry of the cold chutes 921, 922, since the intake apertures 923, 924 are located at the end of the cold chutes 921, 922.

Figure 10A:
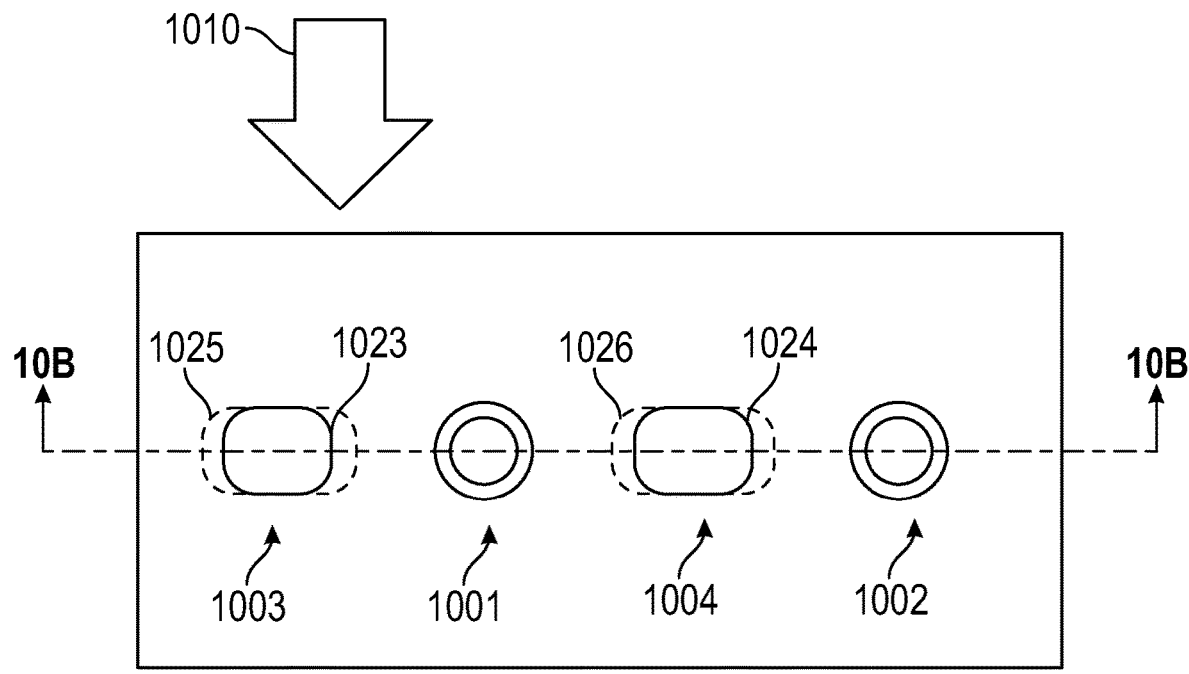
FIG. 10A illustrates another embodiment of varying dilution holes, providing a view towards the centerline axis from the cold side of a liner of the combustion chamber to the hot side of the liner.
Figure 10B:
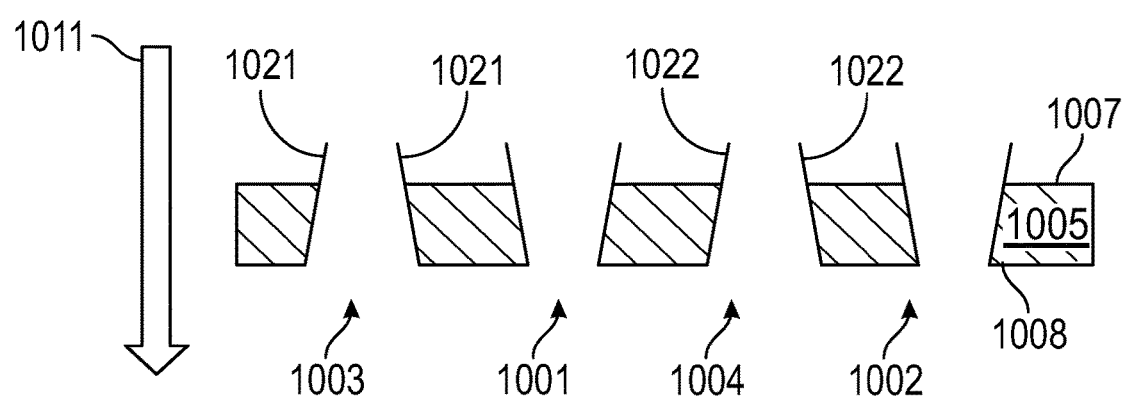
FIG. 10B shows a cross section of the varying dilution holes in FIG. 10A taken along line 10B-10B, providing a view looking forward from a position aft of the combustion chamber.

FIGS. 10A and 10B illustrate another embodiment of varying dilution holes 1001, 1002, 1003, 1004, in a liner 1005 of the combustion chamber 315 of FIG. 4. FIG. 10A provides a view towards the centerline axis 220 from a cold side 1007 (see FIG. 10B) of the liner 1005 (outside the combustion chamber 315), to a hot side 1008 (see FIG. 10B) of the liner 1005 (inside the combustion chamber 315). FIG. 10B shows a cross section of the dilution holes 1001, 1002, 1003, 1004 in FIG. 10A taken along line 10B-10B, in a view from the aft, looking forward, of the combustion chamber 315. The liner 1005 may be an outer liner or an inner liner. The dilution holes 1001 to 1004 are shown arranged along the circumferential direction of the combustor 230, and additional dilution holes (not shown) may also be arranged along the axial direction of the combustor 230.

Air from the high-pressure compressor flows in the axial direction (represented by arrow 1010) along the cold side 1007 of the liner 1005, enters the dilution holes 1001 to 1004 in the transverse direction (represented by arrow 1011), and exits the dilution holes 1001 to 1004 on the hot side 1008 of the liner 1005 into the combustion chamber 315.

The dilution holes 1001 to 1004 include converging dilution holes 1001, 1002 and diverging dilution holes 1003, 1004. The converging dilution holes 1001, 1002 in this example are similar to the converging dilution holes 701, 702 described with reference to FIGS. 7A and 7B.

The diverging dilution holes 1003, 1004 are also inserts in this embodiment, with cold chutes 1021, 1022 that extend above the surface of the cold side 1007 of the liner 1005. In this case, the diverging dilution holes 1003, 1004 do not have any hot side chutes. The diverging dilution holes 1003, 1004 have rectangular oval (i.e., "racetrack") shaped intake apertures 1023, 1024 on the cold side 1007 of the liner 1005 and racetrack shaped exit apertures 1025, 1026 on the hot side 1008 of the liner 1005. In this example, the short axis of the racetrack for the intake apertures 1023, 1024 is equal to the short axis of the racetrack for the exit apertures 1025, 1026, and is aligned in the axial direction (e.g., parallel to arrow 1010). The long axis of the racetrack for the intake apertures 1023, 1024 is less than the long axis of the racetrack for the exit apertures 1025, 1026, and is aligned in the circumferential direction. Note that exit apertures 1025, 1026 are depicted with dashed outlines in FIG. 10, to indicate that the exit apertures 1025, 1026 are not directly visible in this view.

Since the long axis of the exit apertures 1025, 1026 is greater than the long axis of the intake apertures 1023, 1024, the circumferential diameter of the diverging dilution holes 1003, 1004 increases linearly from the intake apertures 1023, 1024, to the surface of the cold side 1007, to the exit apertures 1025, 1026 at the surface of the hot side 1008. Accordingly, the diverging dilution holes 1003, 1004 have a trapezoidal profile that is wider on the hot side 1008 of the liner 1005 and narrower on the cold side 1007 of the liner 1005. The combination of a circular converging dilution hole for higher penetration and a race track diverging dilution hole to get higher later spread of the dilution jet helps in controlling both penetration and circumferential spread to reduce high temperatures in the core of the combustion chamber 315, and, also, near the hot side 1008 of the liner 1005.

As noted above, the short axis of the exit apertures 1025, 1026 is equal to the diameter of the corresponding intake apertures 1023, 1024. In some embodiments of diverging dilution holes 1003, 1004, however, the short axis of the exit apertures 1025, 1026 may be less than or greater than the diameter of the corresponding intake apertures 1023, 1024, depending on the geometry of the cold chutes 1021, 1022, since the intake apertures 1023, 1024 are located at the end of the cold chutes 1021, 1022.

Figure 11A:
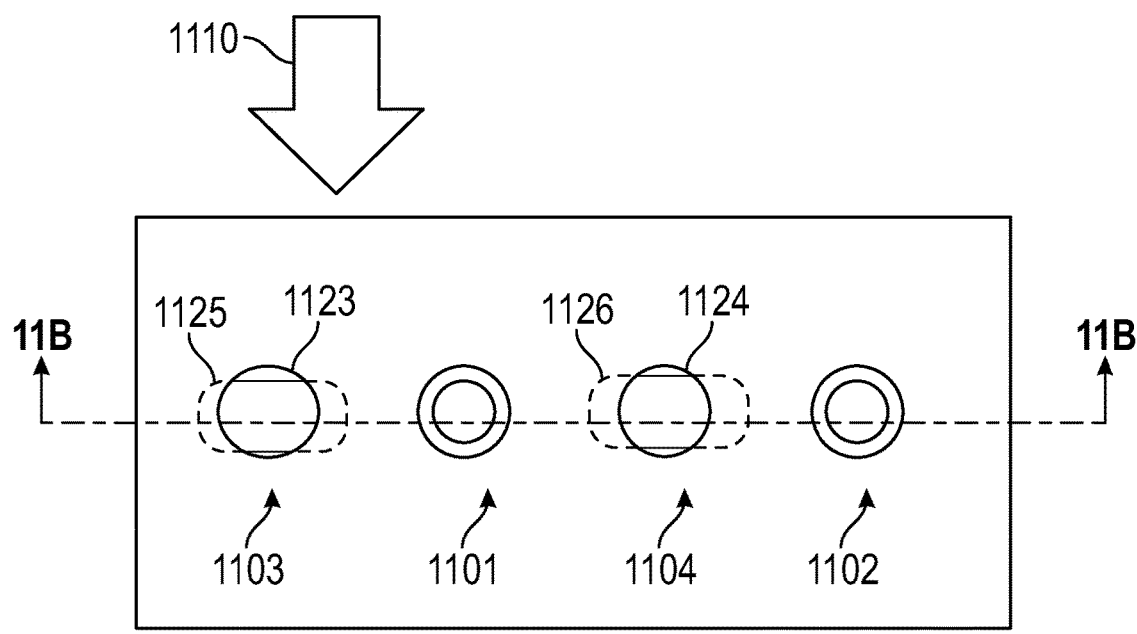
FIG. 11A illustrates one more embodiment of varying dilution holes, providing a view towards the centerline axis from the cold side of a liner of the combustion chamber to the hot side of the liner.
Figure 11B:
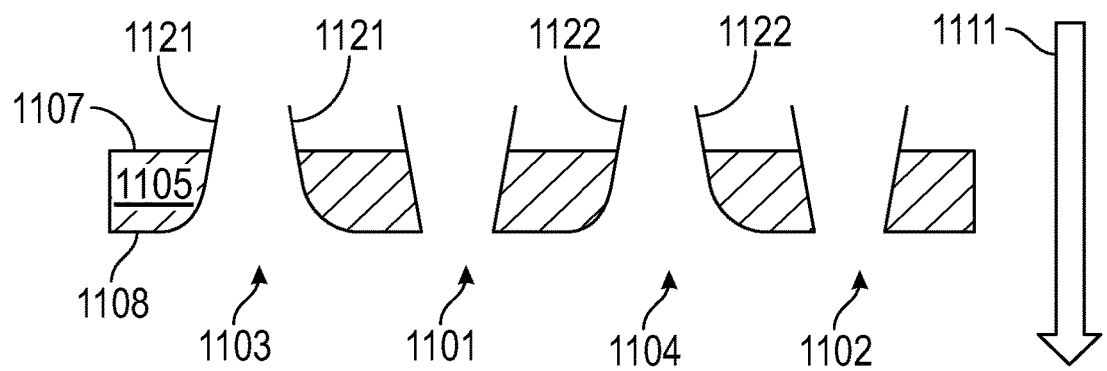
FIG. 11B shows a cross section of the varying dilution holes in FIG. 11A taken along line 11B-11B, providing a view looking forward from a position aft of the combustion chamber.

FIGS. 11A and 11B illustrate another embodiment of varying dilution holes 1101, 1102, 1103, 1104, in a liner 1105 of the combustion chamber 315 of FIG. 4. FIG. 11A provides a view towards the centerline axis 220 from a cold side 1107 (see FIG. 11B) of the liner 1105 (outside the combustion chamber 315), to a hot side 1108 (see FIG. 11B) of the liner 1105 (inside the combustion chamber 315). FIG. 11B shows a cross section of the dilution holes 1101, 1102, 1103, 1104 in FIG. 11A taken along line 11B-11B, in a view from the aft, looking forward, of the combustion chamber 315. The liner 1105 may be an outer liner or an inner liner. The dilution holes 1101 to 1104 are shown arranged along the circumferential direction of the combustor 230 (see FIG. 4), and additional dilution holes (not shown) may also be arranged along the axial direction of the combustor 230.

Air from the high-pressure compressor flows in the axial direction (represented by arrow 1110) along the cold side 1107 of the liner 1105, enters the dilution holes 1101 to 1104 in the transverse direction (represented by arrow 1111), and exits the dilution holes 1101 to 1104 on the hot side 1108 of the liner 1105 into the combustion chamber 315.

The dilution holes 1101 to 1104 include converging dilution holes 1101, 1102 and diverging dilution holes 1103, 1104. The converging dilution holes 1101, 1102 in this example are similar to the converging dilution holes 701, 702 described with reference to FIGS. 7A and 7B.

The diverging dilution holes 1103, 1104 are also inserts in this embodiment, with cold chutes 1121, 1122 that extend above the surface of the cold side 1107 of the liner 1105. In this case, the diverging dilution holes 1103, 1104 do not have any hot side chutes. The diverging dilution holes 1103, 1104 have circular shaped intake apertures 1123, 1124 on the cold side 1107 of the liner 1105 and racetrack shaped exit apertures 1125, 1126 on the hot side 1108 of the liner 1105. The short axis of the racetrack for the exit apertures 1125, 1126 is aligned in the axial direction (e.g., parallel to arrow 1110), and the long axis of the racetrack for the exit apertures 1125, 1126, and is aligned in the circumferential direction. In this example, the diameter of the intake apertures 1123, 1124 is greater than the short axis of the racetrack for the exit apertures 1125, 1126. The diameter of the intake apertures 1123, 1124 is less than the long axis of the racetrack for the exit apertures 1125, 1126. In some embodiments, the intake apertures 1123, 1124 have a chamfer edge for smoother airflow entry, and smoothly rounded exit apertures 1125, 1126 to further improve lateral spread.

Note that portions of the exit apertures 1125, 1126 are depicted with dashed outlines in FIG. 11A, to indicate that, in this example, their long axis is greater than that of the diameter of the corresponding intake apertures 1123, 1124, and, therefore, portions of the exit apertures 1125, 1126 are not directly visible in this view. In some embodiments of diverging dilution holes 1103, 1104, however, the diameter of the intake apertures 1123, 1124 may be equal to or greater than the long axis of the racetrack for the exit apertures 1125, 1126, depending on the geometry of the cold chutes 1121, 1122, since the intake apertures 1123, 1124 are located at the end of the cold chutes 1121, 1122.

Since the diameter of the intake apertures 1123, 1124 is less than the long axis of the racetrack for the exit apertures 1125, 1126, the circumferential diameter of the diverging dilution holes 1103, 1104 increases non-linearly from the intake apertures 1123, 1124, to the surface of the cold side 1107, to the surface of the hot side 1108. Accordingly, the diverging dilution holes 1103, 1104 have a bell-shaped profile that is narrower on the hot side 1108 of the liner 1105 and wider on the cold side 1107 of the liner 1105.

Further aspects of the present disclosure are provided by the subject matter of the following clauses.

A combustor for a turbomachine engine comprises a combustion chamber, a liner forming a boundary of the combustion chamber, and a plurality of dilution holes through the liner to permit airflow into the combustion chamber, wherein the plurality of dilution holes comprises converging dilution holes and diverging dilution holes, the converging dilution holes having a converging cross-sectional profile and the diverging dilution holes having a diverging cross-sectional profile.

The combustor of the preceding clause, wherein at least one of the diverging dilution holes has a cross-sectional profile that is one of a rectangle, a trapezoid, an hourglass, and a double trapezoid.

The combustor of any of the preceding clauses, wherein the liner is one of an outer liner and an inner liner each having a cylindrical shape around a centerline axis of the turbomachine engine, a radius of the outer liner being greater than a radius of the inner liner, an outer boundary of an annular volume of the combustion chamber being defined by the outer liner, and an inner boundary of the annular volume of the combustion chamber being defined by the inner liner, wherein the plurality of dilution holes is arranged on the liner in a repeating pattern of a first number of converging dilution holes and a second number of diverging dilution holes.

The combustor of any of the preceding clauses, wherein the repeating pattern is one of a circumferential pattern arranged on the liner around the centerline axis of the turbomachine engine and an axial pattern arranged on the liner along the centerline axis of the turbomachine engine, wherein the plurality of dilution holes further comprises constant area dilution holes having a constant cross-sectional profile, and the repeating pattern includes a third number of constant area dilution holes.

The combustor of any of the preceding clauses, wherein the first number of converging dilution holes is between one and three inclusive, the second number of diverging dilution holes is between one and three inclusive, and the third number of constant area dilution holes is between one and three inclusive.

The combustor of any of the preceding clauses, wherein the liner is the outer liner, the repeating pattern is a first repeating pattern, the plurality of dilution holes is arranged on the outer liner in the first repeating pattern, and the combustor further comprises an inner liner and a second plurality of dilution holes through the inner liner to permit airflow into the combustion chamber. The second plurality of dilution holes comprises converging dilution holes and diverging dilution holes arranged in a second repeating pattern on the inner liner.

The combustor of any of the preceding clauses, wherein the first repeating pattern on the outer liner and the second repeating pattern on the inner liner each alternate between a single converging dilution hole and a single diverging dilution hole, the diverging dilution holes on the outer liner being arranged opposite to diverging dilution holes on the inner liner, and the converging dilution holes on the outer liner being arranged opposite to converging dilution holes on the inner liner.

The combustor of any of the preceding clauses, wherein the diverging dilution holes on the outer liner are arranged opposite to the diverging dilution holes on the inner liner, and the converging dilution holes on the outer liner are arranged opposite to the converging dilution holes on the inner liner.

The combustor of any of the preceding clauses, wherein the diverging dilution holes on the outer liner are arranged opposite to the converging dilution holes on the inner liner, and the diverging dilution holes on the outer liner are arranged opposite to the converging dilution holes on the inner liner.

The combustor of any of the preceding clauses, wherein each dilution hole in the plurality of dilution holes has an intake aperture on a cold surface of the liner outside the combustion chamber, and an exit aperture on a hot surface of the liner inside the combustion chamber.

The combustor of any of the preceding clauses, wherein the at least one of the plurality of dilution holes is an insert that extends through an existing hole in the liner from the cold surface to the hot surface.

The combustor of any of the preceding clauses, wherein the insert comprises at least one of a cold chute that extends beyond the cold surface outside the combustion chamber and a hot chute that extends beyond the hot surface inside the combustion chamber.

The combustor of any of the preceding clauses, wherein the intake aperture of at least one of the converging dilution holes has a first area, and the exit aperture of the at least one converging dilution holes has a second area, the second area being less than the first area, and wherein the intake aperture of at least one of the diverging dilution holes has a third area, and the exit aperture of the at least one diverging dilution holes has a fourth area, the fourth area being greater than the third area.

The combustor of any of the preceding clauses, wherein at least one of the intake aperture and the exit aperture of at least one of the plurality of dilution holes in the plurality of dilution holes is one of a rounded aperture, a chamfered aperture, and a bell-shaped aperture in shape.

The combustor of any of the preceding clauses, wherein at least one of the intake aperture and the exit aperture of at least one of the diverging dilution holes is one of a circle and a racetrack in shape.

The combustor of any of the preceding clauses, wherein at least one of the diverging dilution holes has a mesh across the intake aperture, and wherein air entering the dilution hole through the mesh across the intake aperture decreases velocity within the dilution hole to create a high-pressure region adjacent to the exit aperture on the hot surface of the liner inside the combustion chamber.

The combustor of any of the preceding clauses, wherein air entering the combustion chamber through a converging dilution hole increases velocity to create a low-pressure region adjacent to the exit aperture on the hot surface of the liner inside the combustion chamber, wherein air entering the combustion chamber through a diverging dilution hole decreases velocity to create a high-pressure region adjacent to the exit aperture on the hot surface of the liner inside the combustion chamber, and wherein gases within the combustion chamber stretch towards the low-pressure region and deflect away from the high-pressure region.

A turbomachine engine comprises (A) a compressor section, (B) a fan assembly that provides intake air to the compressor section, (C) a turbine section that drives the compression section, and (D) a combustor arranged to receive compressed air from the compressor section and to provide hot gas to the turbine section. The combustor comprises (a) a combustion chamber, (b) a liner forming a boundary of the combustion chamber, and (c) a plurality of dilution holes through the liner to permit airflow into the combustion chamber, wherein the plurality of dilution holes comprises converging dilution holes and diverging dilution holes, the converging dilution holes having a converging cross-sectional profile and the diverging dilution holes having a diverging cross-sectional profile.

The turbomachine engine of the preceding clause, wherein the liner is one of an outer liner and an inner liner each having a cylindrical shape around a centerline axis of the turbomachine engine, a radius of the outer liner being greater than a radius of the inner liner, an outer boundary of an annular volume of the combustion chamber being defined by the outer liner, and an inner boundary of the annular volume of the combustion chamber being defined by the inner liner, wherein the plurality of dilution holes is arranged on the liner in a repeating pattern of a first number of converging dilution holes and a second number of diverging dilution holes.

The turbomachine engine of any of the preceding clauses, wherein the repeating pattern is one of a circumferential pattern arranged on the liner around the centerline axis of the turbomachine engine and an axial pattern arranged on the liner along the centerline axis of the turbomachine engine.

Although the foregoing description is directed to the preferred embodiments, it is noted that other variations and modifications will be apparent to those skilled in the art, and may be made without departing from the spirit or scope of the disclosure Moreover, features described in connection with one embodiment may be used in conjunction with other embodiments, even if not explicitly stated above.

The invention claimed is:

1. A combustor for a turbomachine engine, the combustor comprising:
   a combustion chamber;
   a liner forming a boundary of the combustion chamber; and
   a plurality of dilution holes through the liner to permit airflow into the combustion chamber,
   wherein each dilution hole in the plurality of dilution holes has an intake aperture on a cold surface of the liner outside the combustion chamber, and an exit aperture on a hot surface of the liner inside the combustion chamber, and
   wherein the plurality of dilution holes comprises converging dilution holes and diverging dilution holes, the converging dilution holes having a converging cross-sectional profile that is wider on the cold surface of the liner and narrower on the hot surface of the liner, and the diverging dilution holes having a diverging cross-sectional profile that is wider on the hot surface of the liner and narrower on the cold surface of the liner.

2. The combustor of claim 1, wherein at least one of the diverging dilution holes has a cross-sectional profile that is one of, a trapezoid, an hourglass, and a double trapezoid.

3. The combustor of claim 1, wherein the liner is one of an outer liner and an inner liner each having a cylindrical shape around a centerline axis of the turbomachine engine, a radius of the outer liner being greater than a radius of the inner liner, an outer boundary of an annular volume of the combustion chamber being defined by the outer liner, and an inner boundary of the annular volume of the combustion chamber being defined by the inner liner, and
   wherein the plurality of dilution holes is arranged in a repeating pattern on the liner, the repeating pattern having a first number of converging dilution holes and a second number of diverging dilution holes.

4. The combustor of claim 3, wherein the repeating pattern is one of a circumferential pattern around the centerline axis of the turbomachine engine and an axial pattern along the centerline axis of the turbomachine engine, wherein the plurality of dilution holes further comprises constant area dilution holes having a constant cross-sectional profile, and the repeating pattern includes a third number of constant area dilution holes.

5. The combustor of claim 4, wherein the first number of converging dilution holes is between one and three inclusive, the second number of diverging dilution holes is between one and three inclusive, and the third number of constant area dilution holes is between one and three inclusive.

6. The combustor of claim 3, wherein the liner is the outer liner, the repeating pattern is a first repeating pattern, the plurality of dilution holes is arranged in the first repeating pattern, and the combustor further comprises:
   the inner liner; and
   a second plurality of dilution holes through the inner liner to permit airflow into the combustion chamber,
   wherein the second plurality of dilution holes comprises converging dilution holes and diverging dilution holes arranged in a second repeating pattern on the inner liner.

7. The combustor of claim 6, wherein the first repeating pattern on the outer liner and the second repeating pattern on the inner liner each alternate between a single converging dilution hole and a single diverging dilution hole, the diverging dilution holes through the outer liner being arranged opposite to diverging dilution holes through the inner liner, and the converging dilution holes through the outer liner being arranged opposite to converging dilution holes through the inner liner.

8. The combustor of claim 6, wherein the diverging dilution holes through the outer liner are arranged opposite to the diverging dilution holes through the inner liner, and the converging dilution holes through the outer liner are arranged opposite to the converging dilution holes through the inner liner.

9. The combustor of claim 6, wherein the diverging dilution holes through the outer liner are arranged opposite to the converging dilution holes through the inner liner, and the diverging dilution holes through the outer liner are arranged opposite to the converging dilution holes through the inner liner.

10. The combustor of claim 1, wherein at least one of the plurality of dilution holes is an insert that extends through an existing hole in the liner from the cold surface to the hot surface.

11. The combustor of claim 10, wherein the insert comprises at least one of a cold chute that extends beyond the cold surface outside the combustion chamber and a hot chute that extends beyond the hot surface inside the combustion chamber.

12. The combustor of claim 1, wherein at least one of the intake aperture and the exit aperture of at least one of the plurality of dilution holes in the plurality of dilution holes is one of a rounded aperture, a chamfered aperture, and a bell-shaped aperture in shape.

13. The combustor of claim 1, wherein at least one of the intake aperture and the exit aperture of at least one of the diverging dilution holes is one of a circle and a racetrack in shape.

14. The combustor of claim 1, wherein air entering the combustion chamber through a converging dilution hole increases velocity to create a low-pressure region adjacent to the exit aperture on the hot surface of the liner inside the combustion chamber,
wherein air entering the combustion chamber through a diverging dilution hole decreases velocity to create a high-pressure region adjacent to the exit aperture on the hot surface of the liner inside the combustion chamber, and
wherein gases within the combustion chamber stretch towards the low-pressure region and deflect away from the high-pressure region.

15. A turbomachine engine comprising:
(A) a compressor section;
(B) a fan assembly that provides intake air to the compressor section;
(C) a turbine section that drives the compression section; and
(D) a combustor arranged to receive compressed air from the compressor section and to provide hot gas to the turbine section, the combustor comprising:
   (a) a combustion chamber;
   (b) a liner forming a boundary of the combustion chamber; and
   (c) a plurality of dilution holes through the liner to permit airflow into the combustion chamber,
   wherein each dilution hole in the plurality of dilution holes has an intake aperture on a cold surface of the liner outside the combustion chamber, and an exit aperture on a hot surface of the liner inside the combustion chamber, and
   wherein the plurality of dilution holes comprises converging dilution holes and diverging dilution holes, the converging dilution holes having a converging cross-sectional profile that is wider on the cold surface of the liner and narrower on the hot surface of the liner, and the diverging dilution holes having a diverging cross-sectional profile that is wider on the hot surface of the liner and narrower on the cold surface of the liner.

16. The turbomachine engine of claim 15, wherein the liner is one of an outer liner and an inner liner each having a cylindrical shape around a centerline axis of the turbomachine engine, a radius of the outer liner being greater than a radius of the inner liner, an outer boundary of an annular volume of the combustion chamber being defined by the outer liner, and an inner boundary of the annular volume of the combustion chamber being defined by the inner liner, and
wherein the plurality of dilution holes is arranged in a repeating pattern on the liner, the repeating pattern having a first number of converging dilution holes and a second number of diverging dilution holes.

17. The turbomachine engine of claim 16, wherein the repeating pattern is one of a circumferential pattern around the centerline axis of the turbomachine engine and an axial pattern along the centerline axis of the turbomachine engine.

18. A combustor for a turbomachine engine, the combustor comprising:
a combustion chamber;
a liner forming a boundary of the combustion chamber; and
a plurality of dilution holes through the liner to permit airflow into the combustion chamber, wherein the plurality of dilution holes comprises converging dilution holes and diverging dilution holes, the converging dilution holes having a converging cross-sectional profile and the diverging dilution holes having a diverging cross-sectional profile,
wherein each dilution hole in the plurality of dilution holes has an intake aperture on a cold surface of the liner outside the combustion chamber, and an exit aperture on a hot surface of the liner inside the combustion chamber,
wherein the intake aperture of at least one of the converging dilution holes has a first area, and the exit aperture of the at least one converging dilution holes has a second area, the second area being less than the first area, and
wherein the intake aperture of at least one of the diverging dilution holes has a third area, and the exit aperture of the at least one diverging dilution holes has a fourth area, the fourth area being greater than the third area.

19. A combustor for a turbomachine engine, the combustor comprising:
a combustion chamber;
a liner forming a boundary of the combustion chamber; and
a plurality of dilution holes through the liner to permit airflow into the combustion chamber, wherein the plurality of dilution holes comprises converging dilution holes and diverging dilution holes, the converging dilution holes having a converging cross-sectional profile and the diverging dilution holes having a diverging cross-sectional profile,
wherein each dilution hole in the plurality of dilution holes has an intake aperture on a cold surface of the liner outside the combustion chamber, and an exit aperture on a hot surface of the liner inside the combustion chamber,
wherein at least one of the diverging dilution holes has a mesh across the intake aperture, an
wherein air entering the dilution hole through the mesh across the intake aperture decreases velocity within the dilution hole to create a high-pressure region adjacent to the exit aperture on the hot surface of the liner inside the combustion chamber.

* * * * *